United States Patent
Jung

(10) Patent No.: US 10,628,586 B1
(45) Date of Patent: Apr. 21, 2020

(54) DETECTING MALWARE VIA SCANNING FOR DYNAMICALLY GENERATED FUNCTION POINTERS IN MEMORY

(71) Applicant: Palo Alto Networks, Inc., Santa Clara, CA (US)

(72) Inventor: Robert Jung, Albuquerque, NM (US)

(73) Assignee: Palo Alto Networks, Inc., Santa Clara, CA (US)

( * ) Notice: Subject to any disclaimer, the term of this patent is extended or adjusted under 35 U.S.C. 154(b) by 150 days.

(21) Appl. No.: 15/828,172

(22) Filed: Nov. 30, 2017

(51) Int. Cl.
*G06F 21/56* (2013.01)
*G06F 11/30* (2006.01)

(52) U.S. Cl.
CPC ........ *G06F 21/566* (2013.01); *G06F 11/3037* (2013.01); *G06F 21/563* (2013.01)

(58) Field of Classification Search
CPC ...... G06F 21/566; G06F 21/563; G06F 21/56; G06F 21/564; G06F 11/3037
See application file for complete search history.

(56) References Cited

U.S. PATENT DOCUMENTS

| | | | |
|---|---|---|---|
| 9,104,868 B2 * | 8/2015 | Dalcher | G06F 21/566 |
| 9,584,541 B1 * | 2/2017 | Weinstein | H04L 63/145 |
| 2005/0108733 A1 * | 5/2005 | Bermudez | G06F 9/4486 719/328 |
| 2011/0265182 A1 * | 10/2011 | Peinado | G06F 21/554 726/24 |
| 2011/0289586 A1 * | 11/2011 | Kc | G06F 21/566 726/24 |
| 2012/0297057 A1 * | 11/2012 | Ghosh | G06F 21/575 709/224 |
| 2012/0317647 A1 * | 12/2012 | Brumley | G06F 21/00 726/25 |
| 2015/0379263 A1 * | 12/2015 | Vipat | G06F 21/62 726/23 |
| 2016/0021121 A1 * | 1/2016 | Cui | H04L 63/145 726/1 |
| 2016/0156658 A1 * | 6/2016 | Thomas | G06F 21/55 726/24 |

(Continued)

FOREIGN PATENT DOCUMENTS

EP 3217306 9/2017

OTHER PUBLICATIONS

Christopher Kreugel, Evasive Malware Exposed and Deconstructed, RSA Conference 2015, San Francisco, Apr. 20-24, 2015.

(Continued)

*Primary Examiner* — Nelson S. Giddins
(74) *Attorney, Agent, or Firm* — Van Pelt, Yi & James LLP

(57) ABSTRACT

Techniques for detecting malware via scanning for dynamically generated function pointers in memory are disclosed. In some embodiments, a system/process/computer program product for detecting malware via scanning for dynamically generated function pointers in memory includes monitoring changes in memory during execution of a malware sample in a computing environment; detecting a dynamically generated function pointer in memory based on an analysis of the monitored changes in memory during execution of the malware sample in the computing environment; and generating a signature based on detection of the dynamically generated function pointer in memory, wherein the malware sample was determined to be malicious.

19 Claims, 18 Drawing Sheets

(56) References Cited

U.S. PATENT DOCUMENTS

| | | | | |
|---|---|---|---|---|
| 2016/0232379 A1* | 8/2016 | Edwards | .................. | G06F 21/52 |
| 2017/0083701 A1* | 3/2017 | Tajalli | ................... | G06F 16/245 |
| 2017/0103202 A1* | 4/2017 | Kim | ................... | G06F 9/45558 |
| 2017/0243000 A1* | 8/2017 | Shraim | ..................... | H04L 9/00 |
| 2017/0364685 A1* | 12/2017 | Shah | ....................... | G06F 21/53 |
| 2018/0096147 A1* | 4/2018 | Ince | ................... | G06F 11/3604 |
| 2018/0183814 A1* | 6/2018 | Sambandam | ......... | G06F 21/565 |
| 2018/0260562 A1* | 9/2018 | Chen | .................... | G06F 21/562 |
| 2018/0268130 A1* | 9/2018 | Ghosh | .................... | G06F 21/53 |
| 2019/0102540 A1* | 4/2019 | Acar | .................... | G06F 12/145 |

OTHER PUBLICATIONS

Dongyan Xu, An Intergrated Architecture for Automatic Indication, Avoidance, Purdue University, Aug. 20, 2014, Final Report.
Garfinkel et al., A Virtual Machine Introspection Based Architecture for Intrusion Detection, 2003.
Willems et al., CXPInspector: Hypervisor-Based, Hardware-Assisted System Monitoring, Ruhr-Universitat Bochum, Horst Gortz Institute for IT Security, Nov. 26, 2012.

* cited by examiner

DETECTING MALWARE VIA SCANNING FOR DYNAMICALLY GENERATED FUNCTION POINTERS IN MEMORY

BACKGROUND OF THE INVENTION

Nefarious individuals attempt to compromise computer systems in a variety of ways. As one example, such individuals may embed or otherwise include malicious software ("malware") in email attachments and transmit or cause the malware to be transmitted to unsuspecting users. When executed, the malware compromises the victim's computer. Some types of malware attempt to pack or otherwise obfuscate the malicious code to evade detection by firewalls, host security software, and/or virtualized malware analysis. Further, malware authors are using increasingly sophisticated techniques to pack/obfuscate the workings of their malicious software.

BRIEF DESCRIPTION OF THE DRAWINGS

Various embodiments of the invention are disclosed in the following detailed description and the accompanying drawings.

DETAILED DESCRIPTION

Figure 1:
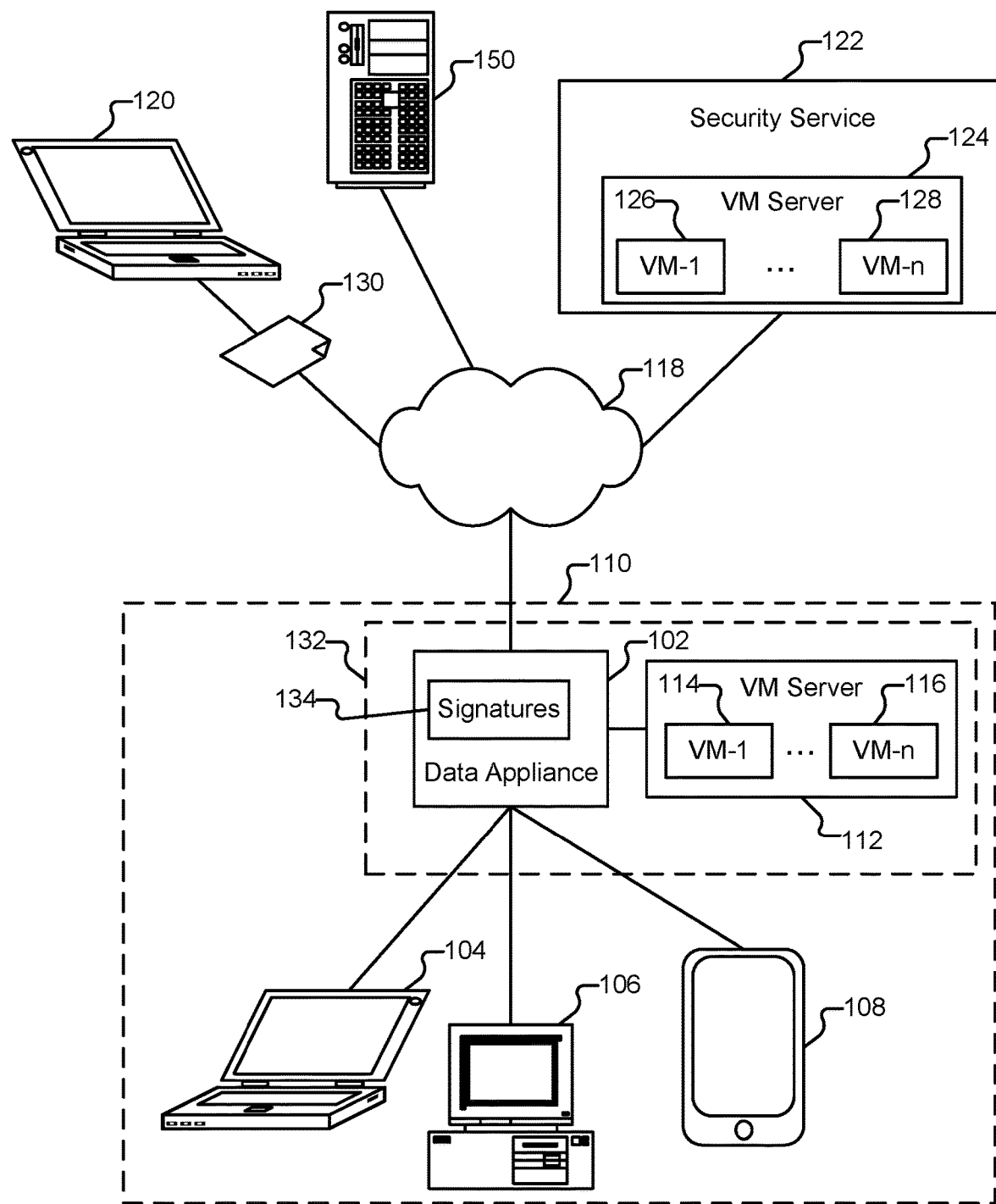
FIG. 1 illustrates an example of an environment in which malware is detected and its harm reduced in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Some types of malware attempt to pack or otherwise obfuscate the malicious code to evade detection by firewalls, host security software (e.g., host security software/agents), and/or virtualized malware analysis. Unfortunately, malware authors are using increasingly sophisticated techniques to pack/obfuscate the workings of their malicious software.

Specifically, some types of malware attempt to obfuscate certain function calls/pointers in the malicious code (e.g., and the malicious code may also be packed or otherwise obfuscated) to avoid malware detection (e.g., as certain anti-malware solutions attempt to identify malware based on the detection of the binary code including calls to certain function pointers). As such, there exists an ongoing need for new and improved techniques to detect malware and prevent its harm.

The deobfuscated or unpacked binaries (e.g., binary code, also referred to herein as code or executable code) typically include the malicious payload that is executed at runtime, which is concealed/kept hidden and only decoded/decompressed and/or decrypted at runtime (e.g., in memory) when needed in an attempt to avoid malware detection with existing malware detection techniques. As discussed above, certain malware may also attempt to obfuscate certain function calls/pointers in the malicious code to avoid malware detection. These evasion/obfuscation approaches have become common practice for malware authors because such can evade detection of their malicious payloads including the obfuscation of certain function calls/pointers that make such detection significantly more difficult (e.g., if the deobfuscated/unpacked malicious payload is not stored on disk (to evade host security detection) and is not transferred across networks (to evade network security/firewall detection) including the use of dynamically generated function pointers as further described below). As such, new and improved computer technology-based security techniques are needed to facilitate efficient and effective detection of malware including obfuscated malware binary code.

Overview of Techniques for Detecting Malware Via Scanning for Dynamically Generated Function Pointers in Memory Current approaches to detecting malware using virtualized malware analysis typically include monitoring predetermined activities of executed malware samples in a virtualized environment (e.g., an instrumented virtualized/sandbox environment can include hooking system/Operating System (OS) calls/APIs and then monitoring such activities, such as to detect registry and/or file system changes).

However, the disclosed new and improved computer technology-based security techniques include performing a malware analysis (e.g., a virtualized malware analysis or host-based malware analysis) by monitoring process memory related activities of executed malware samples (e.g., in a virtualized environment or on the host machine/computing device) to detect potential malicious activities (e.g., including scanning for dynamically generated function pointers in memory) as discussed further below.

Accordingly, various new and improved computer technology-based techniques for detecting malware via scanning for dynamically generated function pointers in memory are disclosed. The disclosed techniques for scanning for dynamically generated function pointers in memory can be performed to determine malicious intent and capability of a malware sample as further described below.

For example, the disclosed techniques for scanning for dynamically generated function pointers in memory can be applied to detect and identify malware for analyzed malware samples, as will be further described below. As used herein, a function pointer generally refers to a pointer in memory that points to executable code within memory, and a dynamically generated function pointer generally refers to a pointer that was written in memory during runtime and points to executable code within memory (e.g., malware can attempt to conceal/obfuscate malicious behaviors by generating a dynamically generated function pointer(s) to one or more system API functions, such as further described below). As another example, the disclosed techniques for scanning for dynamically generated function pointers in memory can also be applied for tagging and/or automated signature generation for malware detection (e.g., to automatically generate signatures for detecting such malware), as will also be further described below.

In some embodiments, techniques for detecting malware via scanning for dynamically generated function pointers in memory include periodically scanning memory for any address(es) that are associated with (e.g., point to) Operating System (OS)/system functions (e.g., including a set of interesting/predetermined OS/system functions as further described below) to provide insight into a given malware sample (e.g., program) during a dynamic analysis of the malware sample (e.g., while executing on an instrumented virtualized/VM environment, or while executing on a host machine using an agent or other software executed on the host machine for monitoring execution of malware on the host machine). For example, this is an effective technique for analyzing malware, because it is a state of practice for malware to conceal/obfuscate certain OS/system calls (e.g., also referred to herein as system functions) using various different concealment/obfuscation approaches. Most of these various different concealment/obfuscation approaches generally require at some point in time during execution for the malware to attempt to resolve the locations of the system functions that it is to call at runtime so that such system functions exist in memory in order to be called (e.g., using dynamically generated function pointers). As such, the disclosed techniques can be applied to efficiently detect the locations of such system functions in memory (e.g., dynamically generated function pointers) as will be further described below.

In one embodiment, techniques for detecting malware via scanning for dynamically generated function pointers in memory include the following operations that can be performed using an instrumented virtualized/VM environment or on a host machine (e.g., using an agent or other software executed on the host machine for monitoring execution of malware on the host machine).

First, maintain a list of the memory locations of accessible system functions (e.g., system/OS calls/API functions). As the program/malware sample under analysis executes, every time a new system library (e.g., or a .dll in the case of a VM/host machine executing the Microsoft Windows OS) is mapped into memory, the location of all the functions that the program can call is determined/parsed as further described below.

Second, these memory locations (e.g., pointers) are flattened into rules that can be used to efficiently search all process memory. In this example, instead of searching one pointer at a time, which is inefficient and time consuming, all memory is searched using a concurrent search algorithm to reduce the search complexity by an order of magnitude to facilitate a significantly more efficient and computationally less expensive operation as further described below.

Third, memory is periodically searched whenever certain execution events occur using the flattened search rule to detect any memory pointers in the memory. In this example, the type of memory, such as heap, stack, PE Image (e.g., in the case of a VM/host machine executing the Microsoft Windows OS), or other/unknown, is also tracked as further described below.

Fourth, the locations where pointers to the system functions that were detected in memory are then filtered. For example, the filtering can be performed to disregard/filter out any pointers that existed in the original binary of the program/malware sample in order to focus the analysis on dynamically generated function pointers that the program/malware sample may be attempting to conceal/obfuscate to avoid malware detection. This list of system functions can also be filtered based on a predetermined set of system functions (e.g., to extract from the list any interesting and useful system functions typically associated with malicious behavior) as further described below.

Finally, the collection of system functions (e.g., dynamically generated function pointers of the unpacked binary detected in memory during execution of the program/malware sample) can be analyzed to determine what program behaviors were being hidden by the program/malware sample attempting to conceal/obfuscate such system function calls as further described below.

For example, detecting that the program/malware sample attempted to conceal/obfuscate such system functions (e.g., using dynamically generated function pointers) can be applied to improve malware detection. As another example, the detection of dynamically generated function pointers can be applied to improve tagging of malware attributes. These and other example applications of the disclosed techniques for detecting malware via scanning for dynamically generated function pointers in memory are further described below.

In one embodiment, techniques for detecting malware via scanning for dynamically generated function pointers in memory include automatically detecting dynamically generated function pointers.

In one embodiment, techniques for detecting malware via scanning for dynamically generated function pointers in memory include automatically detecting dynamically generated function pointers and also automatically detecting OS structure modifications.

In one embodiment, techniques for detecting malware via scanning for dynamically generated function pointers in memory include automatically detecting dynamically generated function pointers and also automatically detecting memory permission changes. For example, a scan of all memory can be performed to determine if there were any permission changes, including permission change types, such as executable/writeable, and memory types, such as the executable image (e.g., sample.exe), stack, heap, or other/unknown memory types (e.g., changed to executable/writeable, which can indicate suspicious or malicious behavior, such as whether the stack in process memory was made executable).

Accordingly, various techniques for detecting malware via scanning for dynamically generated function pointers in memory are disclosed. As will be apparent to one skilled in the art in view of the various techniques and embodiments described herein, the various techniques described herein for providing detecting malware via scanning for dynamically generated function pointers in memory can be performed using cloud-based security solutions, network device-based security solutions, host-based/agent-based security solutions, virtualized/software-defined networking (SDN)-based security solutions, and/or various combinations thereof, such as further described below with respect to various embodiments.

System Environment for Detecting Malware Via Scanning for Dynamically Generated Function Pointers in Memory FIG. 1 illustrates an example of an environment in which malware is detected and its harm reduced in accordance with some embodiments. In the example shown in FIG. 1, a malicious individual (using system 120) has created malware 130. The malicious individual hopes that a client device, such as client device 104, will execute a copy of malware 130, compromising the client device, and causing the client device to then be used for potentially nefarious purposes. For example, the compromised client device can then be instructed to perform tasks (e.g., cryptocurrency mining, participating in denial of service attacks, and/or utilized for lateral movement/advanced persistent threats) and to report information to an external entity, such as command and control (C&C) server 150, as well as to receive instructions from C&C server 150, as applicable.

Returning to the example shown in FIG. 1, suppose client devices 104-108 are a laptop computer, a desktop computer, and a tablet (respectively) present in an enterprise network 110 (belonging to the "Acme Company"). Data appliance 102 is configured to enforce policies regarding communications between clients, such as clients 104 and 106, and nodes outside of enterprise network 110 (e.g., reachable via external network 118, such as the Internet). Examples of such policies include ones governing traffic shaping, quality of service, and routing of traffic. Other examples of policies include security policies such as ones requiring the scanning for threats in incoming (and/or outgoing) email attachments, web site downloads, files exchanged through instant messaging programs, and/or other file transfers. In some embodiments, appliance 102 is also configured to enforce policies with respect to traffic that stays within enterprise network 110.

Appliance 102 can take a variety of forms. For example, appliance 102 can comprise a dedicated device or set of devices. The functionality provided by appliance 102 can also be integrated into or executed as software on a general purpose computer, a computer server, a gateway, and/or a network/routing device. In some embodiments, services provided by data appliance 102 are instead (or in addition) provided to client 104 by software (e.g., host security software or an agent) executing on client 104 (e.g., a host machine/computing device).

Whenever appliance 102 is described as performing a task, a single component, a subset of components, or all components of appliance 102 may cooperate to perform the task. Similarly, whenever a component of appliance 102 is described as performing a task, a subcomponent may perform the task and/or the component may perform the task in conjunction with other components. In various embodiments, portions of appliance 102 are provided by one or more third parties. Depending on factors such as the amount of computing resources available to appliance 102, various logical components and/or features of appliance 102 may be omitted and the techniques described herein adapted accordingly. Similarly, additional logical components/features can be included in embodiments of system 102 as applicable.

As will be described in more detail below, appliance 102 can be configured to work in cooperation with one or more virtual machine servers (112, 124) to perform malware analysis/prevention. As one example, data appliance 102 can be configured to provide a copy of malware 130 to one or more of the virtual machine servers for real-time analysis, in which the malware is executed in an instrumented virtual environment (e.g., where various user level hooks and/or kernel level hooks in an execution environment emulated in a virtual environment facilitate the monitoring of various program behaviors during execution in the virtual environment, such as detecting malware via scanning for dynamically generated function pointers in memory as described herein). As another example, security service 122 (e.g., a cloud-based security service) can provide a list of signatures of known-malicious files (e.g., pattern-based signatures, behavior signatures, and/or other malware signatures) to appliance 102 as part of a subscription, which can be stored in a data plane of data appliance 102 as shown at 134. Those signatures can be generated by security service 122 in conjunction with the techniques for detecting malware via scanning for dynamically generated function pointers in memory as described herein. As yet another example, and as will be described in more detail below, results of analysis performed by the virtual machine servers (e.g., VM server 112 executing VM instances 114 and 116 and/or VM server 124 executing VM instances 126 and 128) can be used to generate those signatures in conjunction with the techniques for detecting malware via scanning for dynamically generated function pointers in memory as described herein.

An example of a virtual machine server is a physical machine comprising commercially available server-class hardware (e.g., a multi-core processor, 64+ Gigabytes of RAM, and one or more Gigabit network interface adapters) that runs commercially available virtualization software, such as VMware ESXi, Citrix XenServer, Kernel Based Virtual Machine (KVM), or Microsoft Hyper-V. The virtual machine server can be configured to run a commercially available hypervisor (without customizations) or a customized hypervisor (whether as a modified version of a commercially-available hypervisor, or a custom-built hypervisor).

Returning to the example of FIG. 1, the virtual machine servers can be separate from, but in communication with, data appliance 102, as shown. A virtual machine server can also perform some or all of the functions of data appliance 102 (or the subset of functions described herein as pertaining to the detection of malware via scanning for dynamically generated function pointers in memory), and a separate data appliance 102 omitted as applicable. Further, a virtual machine server can be under the control of the same entity that administers data appliance 102 (e.g., virtual machine server 112); the virtual machine server can also be provided by a third party (e.g., virtual machine server 124, which can be configured to provide services to appliance 102 via third party service 122). In some embodiments, data appliance 102 is configured to use one or the other of virtual machine servers 112 and 124 for malware analysis. In other embodiments, data appliance 102 is configured to use the services of both servers (and/or additional servers not pictured). Further, in various embodiments, multiple virtual machine servers are present within the same platform. For example, security service 122 (e.g., a commercially available security service, such as the WildFire™ cloud-based malware analysis environment provided by Palo Alto Networks®) can make use of multiple virtual machine servers (in addition to virtual machine server 124). In yet additional embodiments, at least some virtual machine servers are provided by an entity that is different from the operator of security service 122. For example, security service 122 could be operated by a computer security company which makes use of third party cloud computing services, such as Amazon Web Services (AWS), to provide at least some of the computer security company's virtual machine servers. Finally, while examples are described herein as making use of virtual machine servers (e.g., to allow for a single host system executing multiple guest systems at once), the techniques described herein, and in particular, the activities described as being performed inside a guest system, can also be performed using non-virtualized hardware (e.g., to thwart anti-virtual-machine techniques employed by malware).

Figure 2:
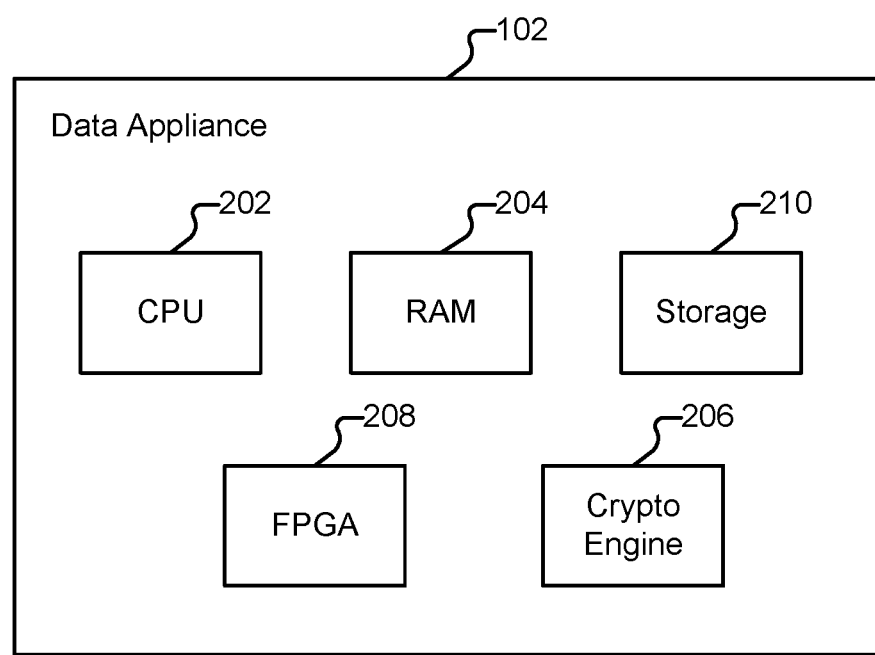
FIG. 2 illustrates an embodiment of a data appliance.

FIG. 2 illustrates an embodiment of a data appliance. The example shown is a representation of physical components that are included in appliance 102, in some embodiments. Specifically, appliance 102 includes a high performance multi-core CPU 202 and RAM 204. Appliance 102 also includes a storage 210 (such as one or more hard disks), which is used to store policy and other configuration information, as well as signatures (e.g., pattern-based signatures, behavior signatures, and/or other malware signatures, which can be generated using the techniques for detecting malware via scanning for dynamically generated function pointers in memory as described herein). Data appliance 102 can also include one or more optional hardware accelerators. For example, data appliance 102 can include a cryptographic engine 206 configured to perform encryption and decryption operations, and one or more FPGAs 208 configured to perform matching, act as network processors, and/or perform other tasks.

Using Virtual Machines to Analyze Files

A virtual machine (VM) can be used to perform behavior profiling (e.g., in a VM sandbox environment) using various heuristic-based analysis techniques that can be performed in real-time during a file transfer (e.g., during an active file/attachment download) and/or on files previously collected (e.g., a collection of files submitted for batch analysis). Documents, executables, and other forms of potentially malicious software/programs (e.g., to be evaluated) are referred to herein as "malware samples" or simply as "samples."

Returning to the example of FIG. 1, suppose a malicious user of system 120 sends an email message to a user of client 104 that includes a malicious attachment. The attachment may be an executable (e.g., having an .exe extension) and may also be a document (e.g., a .doc or .pdf file). The message is received by data appliance 102, which determines whether a signature for the attachment is present on data appliance 102. A signature, if present, can indicate that the attachment is known to be safe, and can also indicate that the attachment is known to be malicious, in accordance with various embodiments. If no signature for the attachment is found, data appliance 102 is configured to provide the attachment to a virtual machine server, such as virtual machine server 112 or 124, for analysis.

Virtual machine server 112 is configured to perform static analysis of samples, and also to perform dynamic analysis of samples, in which the samples are executed (or opened in an application, as applicable) in one or more virtual machine instances 114-116. The virtual machine instances may all execute the same operating system (e.g., Microsoft Windows® XP SP 3, Microsoft Windows® 7, and Microsoft Windows® 10), may execute different operating systems (e.g., Apple Mac® OS or iOS platforms, Google Android® OS platforms, or Linux OS platforms), and/or may collectively execute combinations of operating systems (and/or versions thereof) (e.g., with VM instance 116 emulating an Android operating system). In some embodiments, the VM image(s) chosen to analyze the attachment are selected to match the operating system of the intended recipient of the attachment being analyzed (e.g., where the operating system of client 104 is Microsoft Windows XP SP 2). Observed behaviors resulting from executing/opening the attachment (such as changes to certain platform, software, registry settings, any network connection attempts made, or memory in which changes to memory can be monitored for implementing detection of malware via scanning for dynamically generated function pointers in memory) are logged and analyzed for indications that the attachment is malicious.

In some embodiments, the dynamic analysis is performed in several stages as similarly described above and further described below. Specifically, the dynamic analysis can be performed in several stages to monitor changes to memory for implementing the detection malware via scanning for dynamically generated function pointers in memory as described above and further described below.

In some embodiments log analysis (e.g., of results of static/dynamic analysis) is performed by the VM server (e.g., VM server 112). In other embodiments, the analysis is performed at least in part by appliance 102 (e.g., or a host agent/software executed on the host machine/computing device). The malware analysis and enforcement functionality illustrated in FIG. 1 as being provided by data appliance 102 and VM server 112 is also referred to herein as being provided by malware analysis system 132. As explained above, portions of malware analysis system 132 may be provided by multiple distinct devices, but may also be provided on a single platform, as applicable. For example, the functionality described herein (or portions thereof) as being provided by malware analysis system 132 can also be provided by security service 122 using VM server 124.

If the attachment is determined to be malicious, appliance 102 can automatically block the file download based on the analysis result. Further, a signature can be generated and distributed (e.g., to other data appliances, host security software/agents, and/or to cloud security service 122) to automatically block future file transfer requests to download the file determined to be malicious.

Figure 3:
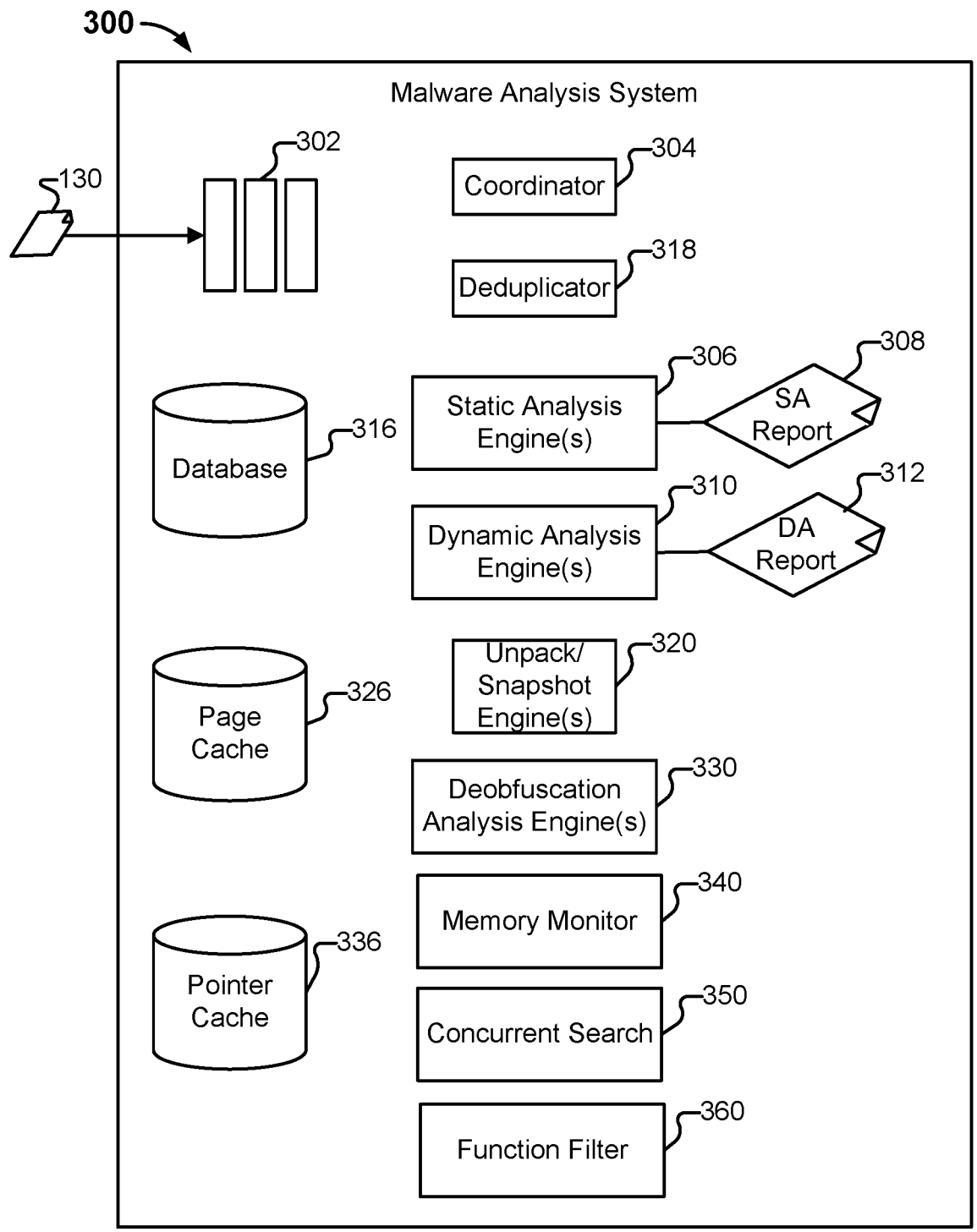
FIG. 3 illustrates an example of logical components that can be included in a malware analysis system for analyzing candidate malware for detecting malware via scanning for dynamically generated function pointers in memory in accordance with some embodiments.

Logical Components for Detecting Malware Via Scanning for Dynamically Generated Function Pointers in Memory FIG. 3 illustrates an example of logical components that can be included in a malware analysis system for analyzing candidate malware for detecting malware via scanning for dynamically generated function pointers in memory in accordance with some embodiments. System 300 can be implemented using a single physical device. System 300 can also be implemented, collectively, across multiple distinct devices. For example, when data appliance 102 works in combination with virtual machine server 112, malware analysis system 132 is an embodiment of system 300. As another example, the functionality of system 300 can be provided by security service 122. As explained above, cloud security service 122 can include a single (124), or multiple virtual machine servers. As yet another example, the functionality of system 300 can be performed (e.g., in whole or at least in part) by a host agent/security software executed on a host device (e.g., client device 104).

As mentioned above, a given piece of candidate malware (e.g., a potentially malicious document/file/etc.) can be received for analysis in a variety of ways. In the following discussion, malware 130 (intended for a client such as client 104 by a malware author) is received by data appliance/platform 102 and a check is made (e.g., against information stored in storage 210) to determine whether malware 130 matches any signatures of known malware. Suppose in the following example that no such signature is present on platform 102, and also that no such signature is present on cloud security service 122 (where platform 102 is configured to check for the existence of a signature on security service 122). Platform 102 sends a copy of malware 130 to security service 122 for further analysis (e.g., before allowing it to be delivered to client device 104). In various embodiments, when a new piece of candidate malware is received for analysis (e.g., an existing signature associated with the file is not present at security service 122), it is added to a processing queue 302.

Coordinator 304 monitors queue 302, and as resources (e.g., a static analysis worker) become available, coordinator 304 fetches a piece of potential malware for analysis from queue 302 for processing (e.g., fetches a copy of malware 130). In particular, coordinator 304 first provides the application to static analysis engine 306 for static analysis. In some embodiments, one or more static analysis engines are included within system 300, where system 300 is a single device. In other embodiments, static analysis is performed by a separate static analysis server that includes a plurality of workers (i.e., a plurality of instances of static analysis engine 306). In yet other embodiments, static analysis is omitted, or provided by a third party, as applicable.

The static analysis engine obtains general information about the candidate malware and includes it (along with heuristic and other information, as applicable) in a static analysis (SA) report 308. The report can be created by the static analysis engine, or by coordinator 304 (or by another appropriate component) which can be configured to receive the information from static analysis engine 306. In some embodiments, the collected information is stored in one or more database records for the candidate malware (e.g., in a database 316), instead of or in addition to a separate static analysis report 308 being created (i.e., portions of the database record form the static analysis report 308).

Once the static analysis is complete, coordinator 304 locates an available dynamic analysis engine 310 to perform dynamic analysis on the candidate malware. As with static analysis engine 306, system 300 can include one or more dynamic analysis engines directly. In other embodiments, dynamic analysis is performed by a separate dynamic analysis server that includes a plurality of workers (i.e., a plurality of instances of dynamic analysis engine 310).

Each dynamic analysis engine manages a virtual machine instance. In some embodiments, results of static analysis (e.g., performed by static analysis engine 306), whether in report form (308) and/or as stored, such as in database 316, are provided as input to a dynamic analysis engine 310. For example, the static analysis report information can be used to help select/customize the virtual machine instance used by dynamic analysis engine 310 (e.g., Microsoft Windows XP Service Pack 3 vs. Windows 7 Service Pack 2). Where multiple virtual machine instances are executed at the same time, a single dynamic analysis engine can manage all of the instances, or multiple dynamic analysis engines can be used (e.g., with each managing its own virtual machine instance), as applicable. In some embodiments, the collected information is stored in one or more database records for the candidate malware (e.g., in database 316), instead of or in addition to a separate dynamic analysis (DA) report 312 being created (i.e., portions of the database record form the dynamic analysis report 312).

As also shown in FIG. 3, malware analysis system 300 includes an unpack/snapshot engine(s) 320, a page cache 326, a deobfuscation analysis engine(s) 330, a pointer cache 336, a memory monitor component 340, a concurrent search component 350, and a function filter 360 that perform various functions for implementing efficient program deobfuscation through system API instrumentation and detecting malware via scanning for dynamically generated function pointers in memory in accordance with some embodiments. For example, during a dynamic analysis phase, dynamic malware analysis engine(s) 310 can utilize unpack/snapshot engine 320 to automatically unpack and selectively snapshot process pages in memory during emulation of the malware sample as similarly described herein. The snapshotted memory pages can be stored in page cache 326. The output of the dynamic analysis including the efficient program deobfuscation through system API instrumentation can be provided as input to deobfuscation analysis engine(s) 330 for reassembling the cached memory pages, analyzing of the reassembled cached memory pages, detecting dynamically generated function pointers in memory and analyzing the dynamically generated function pointers to determine whether their program behaviors are suspicious or malicious, and generating a signature based on a static analysis of the reassembled cached memory pages (e.g., in an example implementation, the static analysis can be performed using static analysis engine(s) 306). The generated signature can be added to database 316.

In one embodiment, a first snapshot of memory is generated at a start of detonation/execution of the malware sample and a second snapshot of memory is generated at a completion of the execution of the malware sample and a comparison of the first and second snapshots can be performed to implement the disclosed techniques for detecting malware via scanning for dynamically generated function pointers in memory. In another embodiment, one or more interim snapshots during the execution of the malware sample can be generated (e.g., based on hooked/intercepted system function call events or based on other events and/or time-based triggers) to implement the disclosed techniques for detecting malware via scanning for dynamically generated function pointers in memory.

Referring to FIG. 3, pointer cache 336 caches/stores a list of the memory locations of accessible system functions (e.g., system/OS calls/API functions). Specifically, as the program/malware sample under analysis executes, memory monitor component 340 monitors memory to detect every time a new system library (e.g., or a .dll in the case of a VM/host machine executing the Microsoft Windows OS) is mapped into memory, the location of all the functions that the program can call is determined/parsed as further described below.

Concurrent search component 350 implements an efficient concurrent search to efficiently search all process memory for function pointers (e.g., including pointers to system functions) as further described below. For example, memory can be periodically searched whenever certain execution events occur using the flattened search rule to detect any memory pointers in the memory. In this example, the type of memory, such as heap, stack, PE Image (e.g., in the case of a VM/host machine executing the Microsoft Windows OS), or other/unknown, is also tracked as further described below.

Function filter 360 can be implemented to filter the locations where pointers to the system functions that were detected in memory are then filtered. For example, the filtering can be performed to disregard/filter out any pointers that existed in the original binary of the program/malware sample in order to focus the analysis on dynamically generated function pointers that the program/malware sample may be attempting to conceal/obfuscate to avoid malware detection. This list of system functions can also be filtered based on a predetermined set of system functions (e.g., to extract from the list any interesting and useful system functions typically associated with malicious behavior) as further described below.

Finally, the collection of system functions (e.g., dynamically generated function pointers of the unpacked binary detected in memory during execution of the program/malware sample) can be analyzed using dynamic analysis engine(s) 310 to determine what program behaviors were being hidden by the program/malware sample attempting to conceal/obfuscate such system function calls as further described below.

In various embodiments, the initial static analysis of candidate malware is omitted or is performed by a separate entity, as applicable. As one example, traditional static and/or dynamic analysis may be performed on files by a first entity. Once it is determined (e.g., by the first entity) that a given file is malicious, and more particularly, that the file is (or is potentially) making use of obfuscation or packing to attempt to conceal malware binaries, then the file can be provided to a second entity (e.g., the operator of security service 122) specifically for additional analysis with respect to the obfuscation or packing to attempt to conceal malware binaries (e.g., by a dynamic analysis engine 310 in coordination with unpack/snapshot engine 320, page cache 326, deobfuscation analysis engine 330, pointer cache 336, memory monitor component 340, concurrent search component 350, and function filter 360).

Comparing Snapshots of Process Memory for Detecting Malware Via Scanning for Dynamically Generated Function Pointers in Memory FIGS. 4A-4E illustrate a functional view of snapshots of process memory of a sandbox at runtime in a malware analysis system for analyzing candidate malware for detecting malware via scanning for dynamically generated function pointers in memory in accordance with some embodiments. For example, the sandbox can implement an instrumented VM environment for performing detection of malware via scanning for dynamically generated function pointers in memory, such as similarly described above with respect to FIGS. 1-3.

Figure 4A:
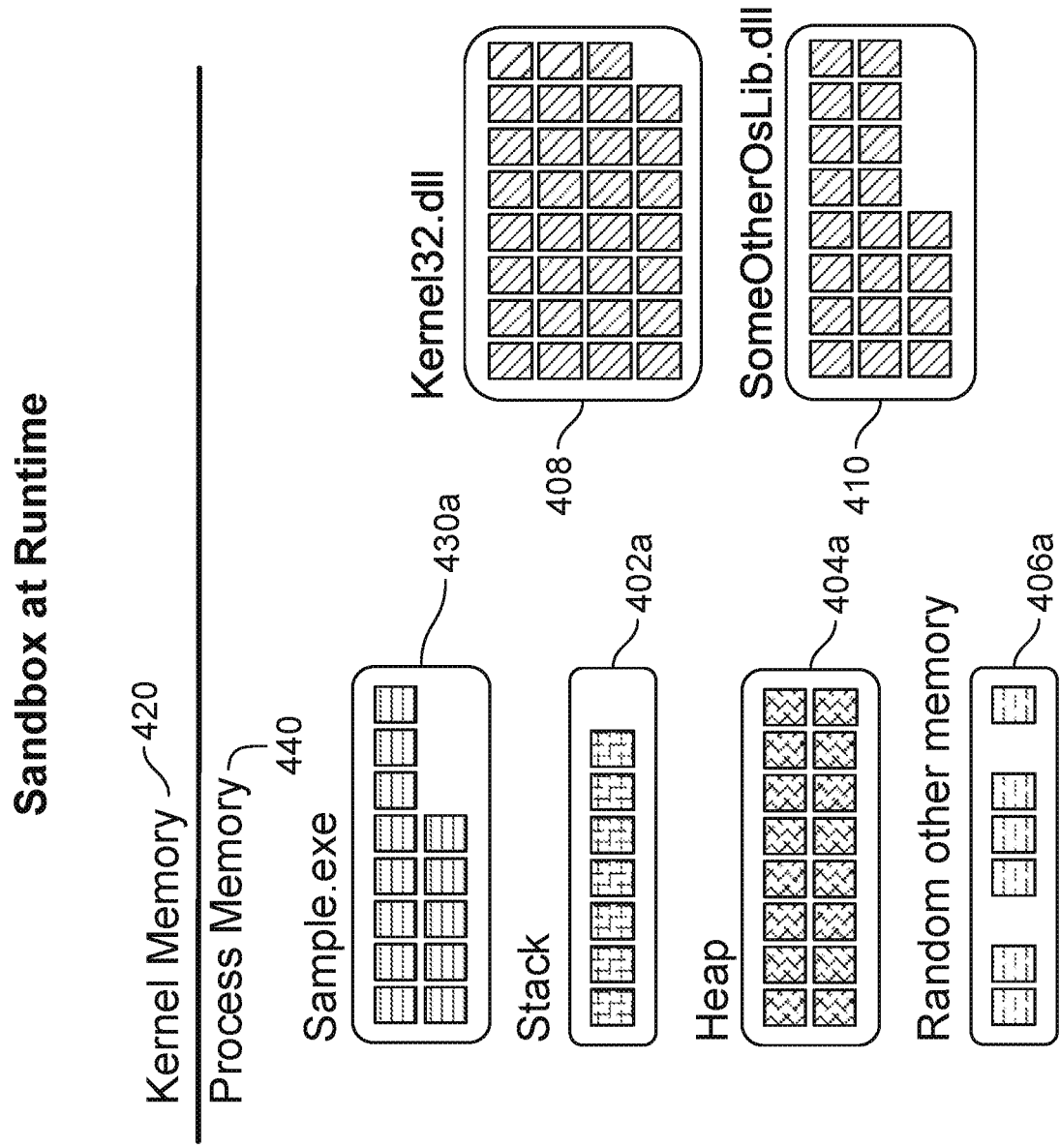
FIGS. 4A-4E illustrate a functional view of snapshots of process memory of a sandbox at runtime in a malware analysis system for analyzing candidate malware for detecting malware via scanning for dynamically generated function pointers in memory in accordance with some embodiments.

Referring to FIG. 4A, a kernel memory 420 and a process memory 440 of a sandbox at runtime are shown. Specifically, FIG. 4A illustrates a first snapshot of the process memory before execution of the malware sample in the sandbox/instrumented VM environment. Process memory 440 includes a sample.exe 430a, a stack 402a, a heap 404a, and other memory 406a, in which pages are monitored in each of these areas of process memory to detect any changes to contents in any of these monitored pages in process memory. In this example, process memory 440 also includes a Kernel32.dll 408 and another library shown as SomeOtherOSLib.dll 410.

Figure 4B:
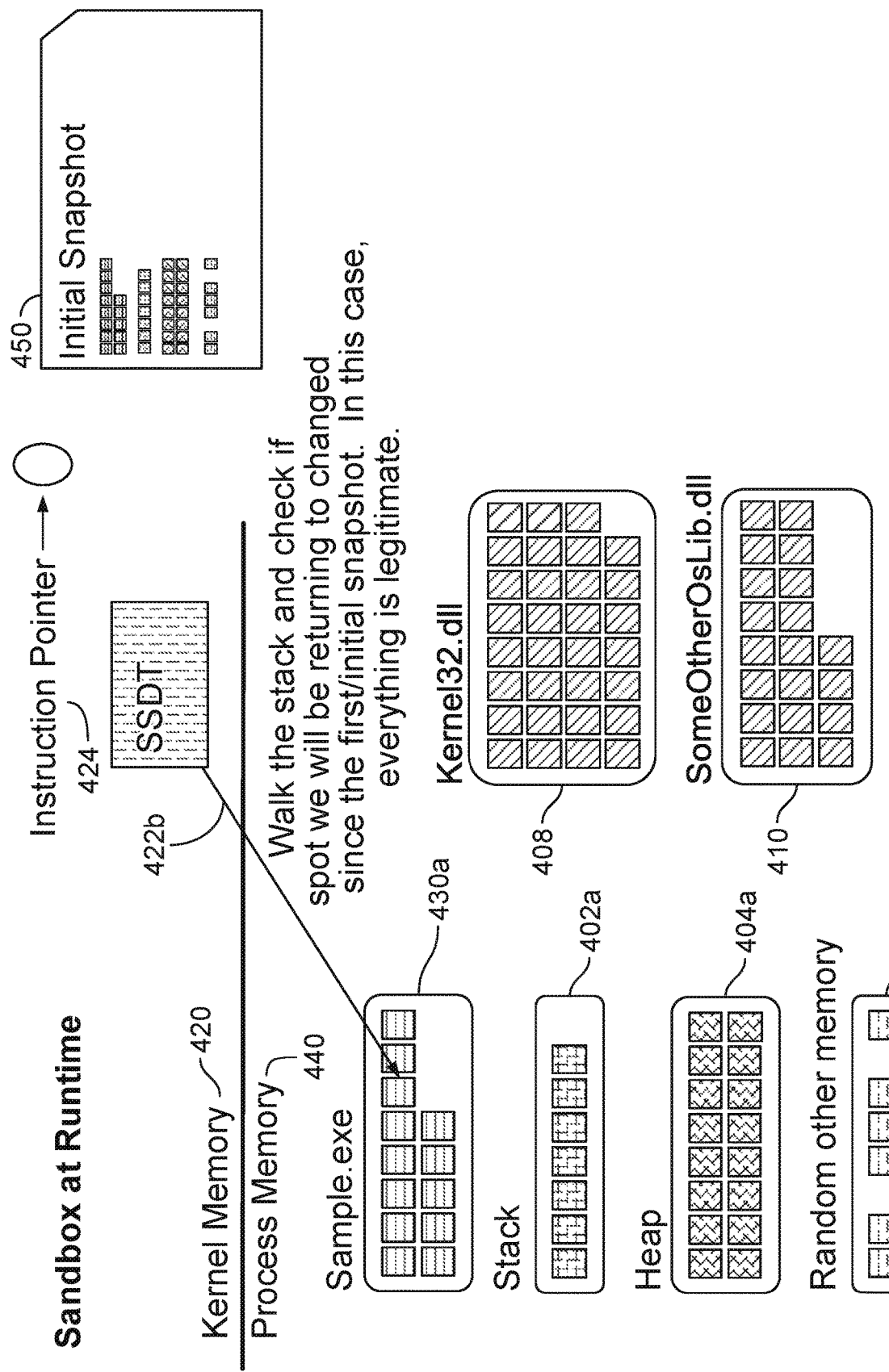

Referring to FIG. 4B, during runtime/execution of sample.exe 430a, stack 402a is monitored to determine if there have been any changes in the stack since the first snapshot, which is shown as initial snapshot 450. Specifically, a System Service Descriptor Table (SSDT) call 422b is hooked/intercepted in this example, which can be used as a system function call event to trigger the process memory monitoring operations (e.g., walking the stack in this example), checking an instruction pointer 424, and determining if the return location has changed since the first snapshot. In this example, it is determined that there have not been any changes in process memory 440 since the first snapshot.

Figure 4C:
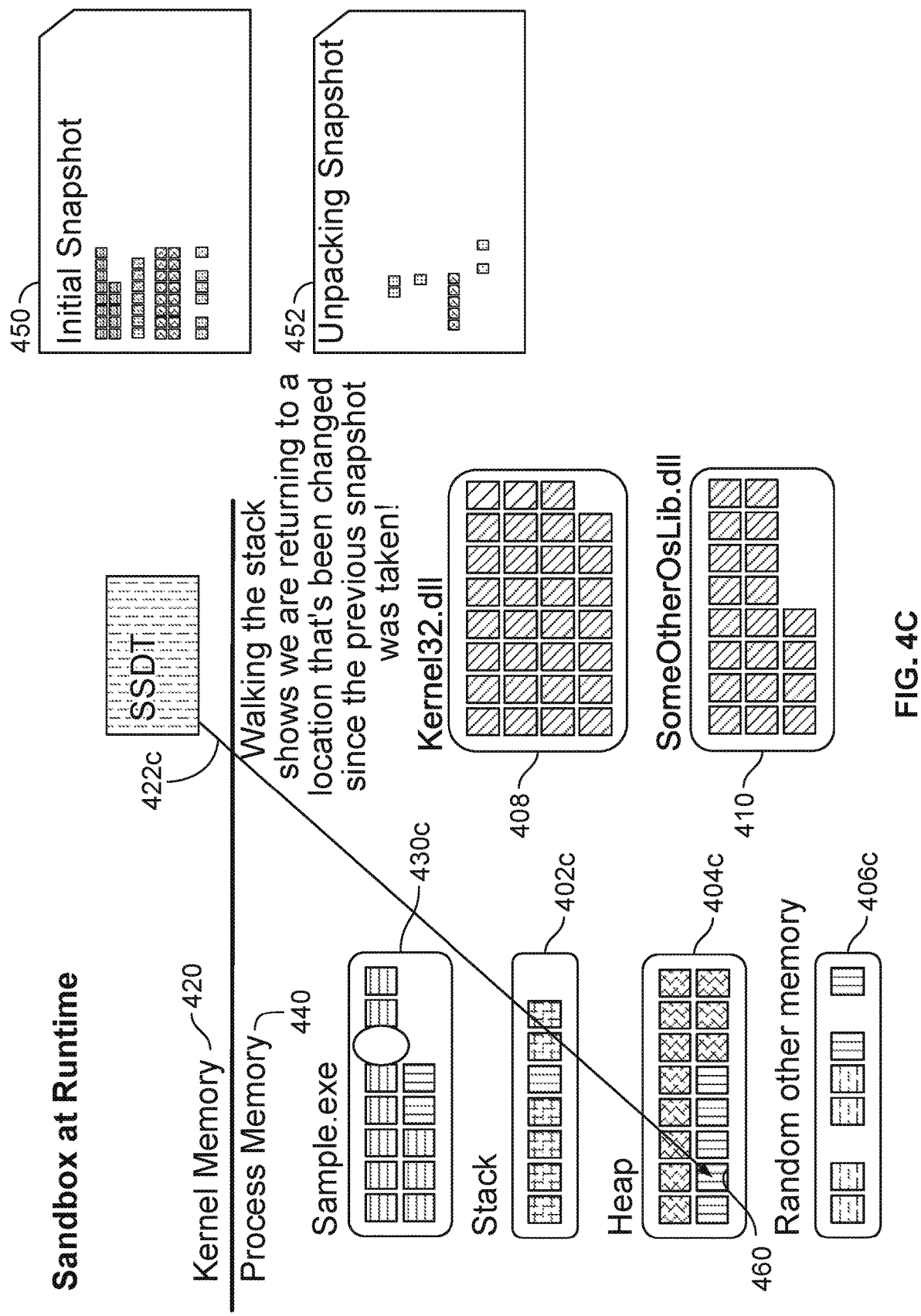

Referring to FIG. 4C, at a later point in time during runtime/execution of sample.exe 430c, stack 402c is monitored to determine if there have been any changes in the stack since the first snapshot, which is shown as unpacking snapshot 452. Specifically, after another SSDT call 422c is hooked/intercepted in this example, it is determined if the return location has changed since the previous snapshot (i.e., unpacking snapshot 452). In this example, it is determined that there have been changes in process memory since the previous snapshot as shown in FIG. 4C and that the return from the system function call (i.e., SSDT 422c) is returning to a page 460 in heap 404c of process memory 440 that has changed since the previous snapshot. As shown in FIG. 4C, the pages that have changed since a previous snapshot are indicated with different highlighting/shading. As also shown in FIG. 4C, pages of memory have been modified in sample.exe 430c, stack 402c, heap 404c, and random other memory 406c.

Figure 4D:
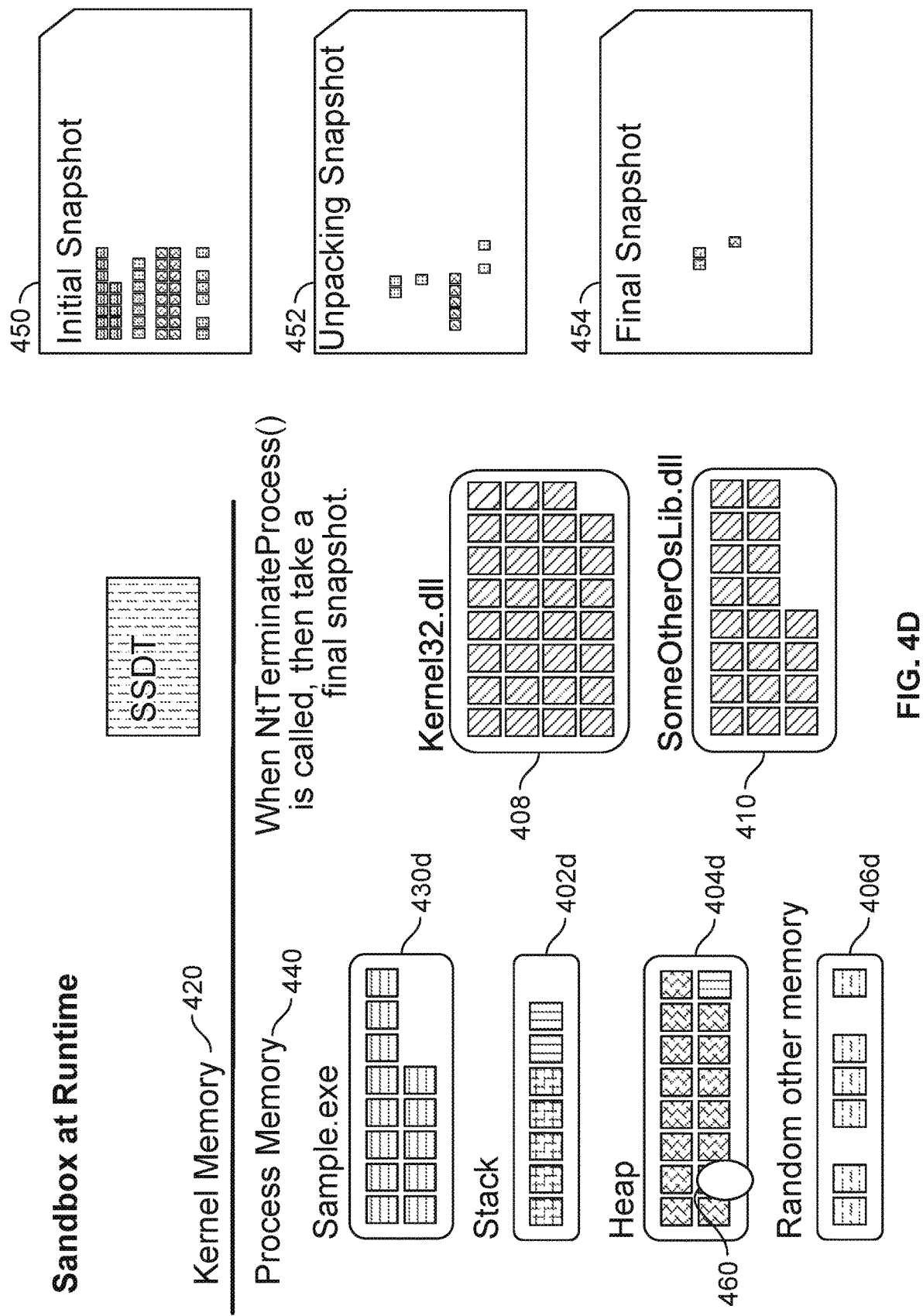

Referring to FIG. 4D, when NtTerminateProcess( ) is called during runtime/execution of sample.exe 430d, a final snapshot is performed to generate a final snapshot of memory 454. As shown at 460, the suspicious change in process memory was detected at page 460 of heap 404d in process memory 440 during the monitored execution of sample.exe 430d. Also, the status of the contents of the stack is shown at 402d, and the status of the contents of the random other memory is shown at 406d. As shown in FIG. 4D, the pages that have changed since a previous snapshot are indicated with different highlighting/shading. Specifically, the unpacking operations resulted in a dynamically generated function pointer in memory in this example.

Figure 4E:
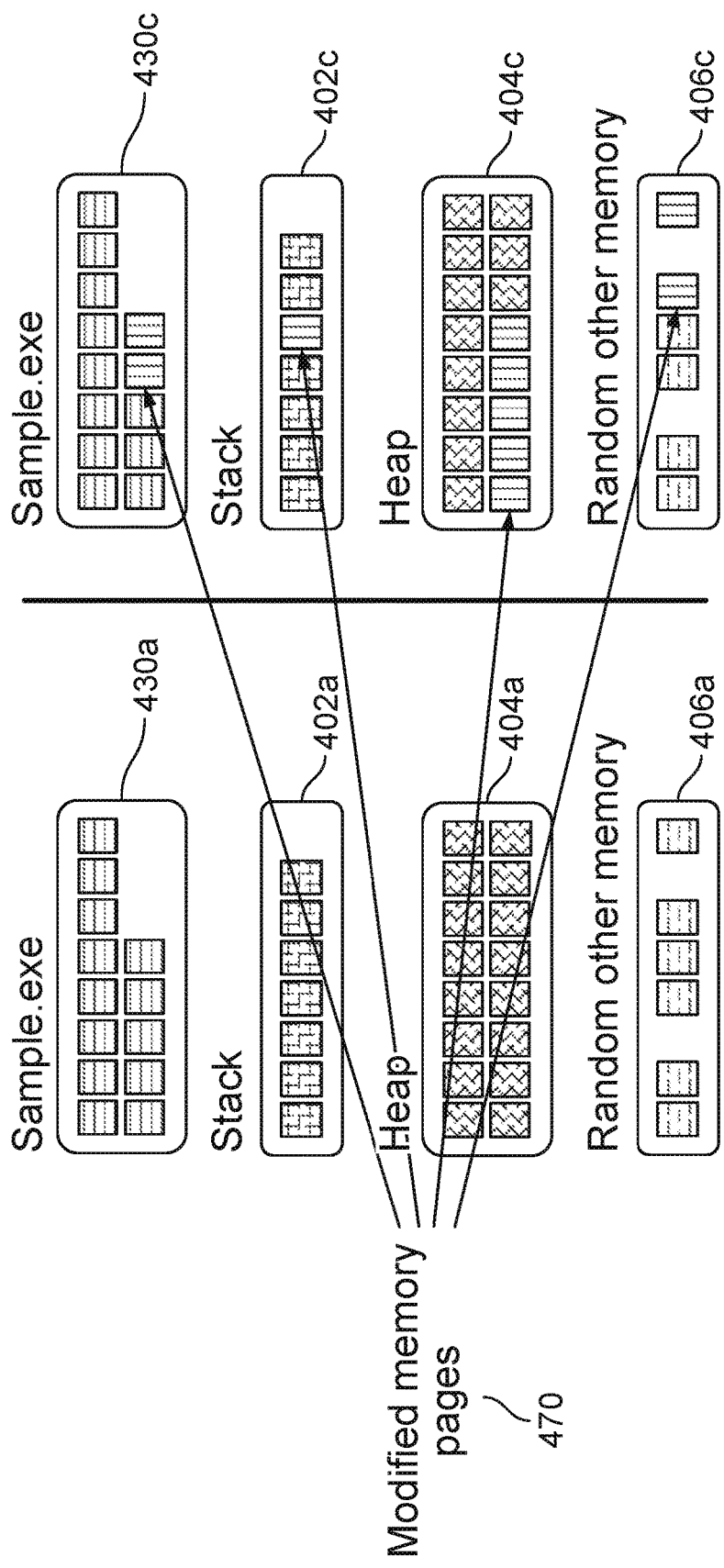

Referring to FIG. 4E, comparing of snapshots is performed to identify any dynamically generated system functions. In this example, a comparison of initial snapshot 450 with unpacking snapshot 452 is shown in FIG. 4E. In an example implementation, a log of all modified memory pages is maintained (e.g., stored/cached in page cache 326), in which a full process memory space for each snapshot can be reconstructed as needed. As shown in FIG. 4E, the pages that have changed since a previous/compared snapshot are indicated with different highlighting/shading. As described above, the modified memory pages shown at 470 can be analyzed to identify any dynamically generated system functions as described above and further described below.

Detecting OS Structure Modifications in Memory

Malware may occasionally modify OS structures in memory (e.g., modify Microsoft Windows OS process structures can be modified in memory during execution of the malware). Accordingly, the disclosed techniques for detecting malware via scanning for dynamically generated function pointers in memory also include detecting OS structure modifications in memory as will now be described.

Figure 5:
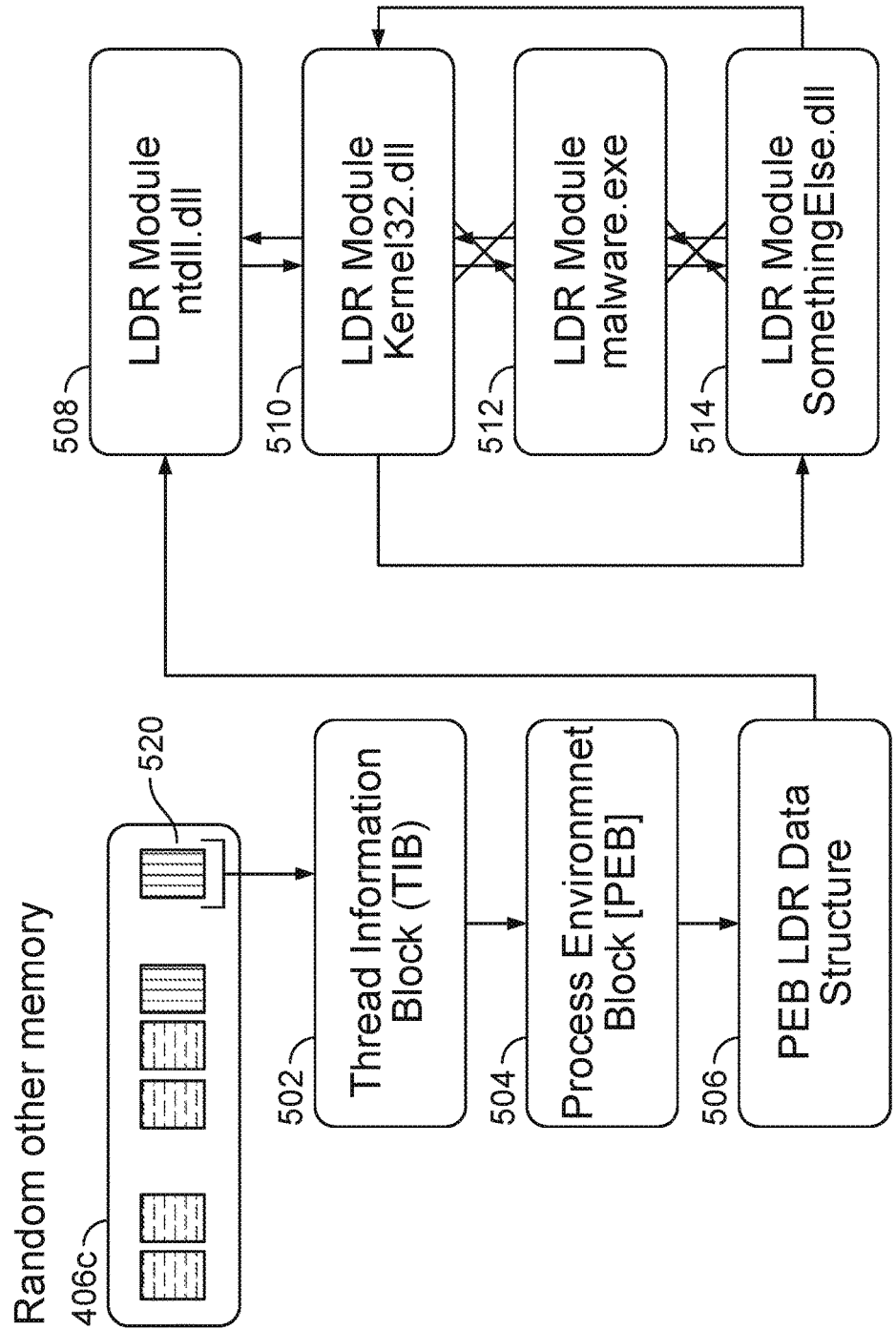
FIG. 5 illustrates a functional view of a snapshot of process memory of a sandbox at runtime in a malware analysis system for detecting OS structure modifications in memory in accordance with some embodiments.

FIG. 5 illustrates a functional view of a snapshot of process memory of a sandbox at runtime in a malware analysis system for detecting OS structure modifications in memory in accordance with some embodiments. For example, the sandbox can implement an instrumented VM environment for performing detection of malware via scanning for dynamically generated function pointers in memory, such as similarly described above with respect to FIGS. 1-3.

As discussed above, malware may occasionally modify OS structures in memory (e.g., modify Microsoft Windows OS process structures can be modified in memory during execution of the malware). As shown in FIG. 5, a snapshot 406c of random other memory during dynamic/runtime analysis of a malware sample as described above can also be analyzed to detect whether the malware sample modified any OS process structures in process memory. As similarly described above, a comparison of snapshots of process memory can be performed to detect whether any OS process structures were modified in process memory during the dynamic/runtime analysis of the malware sample. In this example, the malware sample modified Microsoft Windows OS process structures to remove itself from the LDR_Module list as shown at 512. Specifically, the comparison of snapshots of process memory determined that a page 520 of random other memory 406c was modified during the dynamic/runtime analysis of the malware sample. In this example, an automated analysis to search for modifications of a set/list of predetermined OS process structures can determine that a Thread Information Block (TIB) 502 linked to a Process Environment Block (PEB) 504 that linked to a PEB LDR Data Structure 506 that linked to a LDR Module ntdll.dll 508 that linked to a LDR Module kernel32.dll 510. However, based on the snapshot comparison, the automated analysis can determine that a LDR Module malware.exe 512 was removed from the list as LDR Module kernel32.dll 510 now just links to LDR Module SomethingElse.dll 514.

In an example implementation, a list of the types of OS structure modifications in memory that are detected for a Microsoft Windows OS (e.g., Microsoft Windows version 7) include one or more of the following:

a. PEB_BEING_DEBUGGED_FLAG_SET: The software has set the "being debugged" flag in the OS structures. This is a common malware trick to determine if the flag in the OS structures matches the output of the WINAPI funcs to check whether they are being debugged.

b. PEB_IMAGE_BASE_ADDRESS_MODIFIED: The Image Base address in the Process Environment Block was changed.

c. LDR_MODULE_FULL_DLL_NAME_MODIFIED: The Full Dll Name field in an LDR MODULE structure was changed.

d. LDR_MODULE_BASE_ADDRESS_MODIFIED: The Base Address field in an LDR MODULE structure was changed.

e. LDR_MODULE_SIZE_OF_IMAGE_MODIFIED: The Size of Image field in an LDR MODULE structure was changed.

f. LDR_MODULE_ENTRYPOINT_MODIFIED: The Entry Point field in an LDR MODULE structure was changed.

g. MAIN_PE_IMAGE_UNHOOKED_FROM_MODULE_LIST: The main executable image was unhooked from the module list.

h. MODULE_REMOVED_FROM_MODULES_LIST: A module was removed from the LDR MODULE list.

i. MODULE_LISTS_DIFFERENT_SIZES: There are three lists of LDR MODULE structures that should be the same size. In this case a discrepancy was detected.

In addition, various other types of OS structure modifications in memory can be detected for the Microsoft Windows OS (e.g., Microsoft Windows version 7) or for other Microsoft Windows OS versions and/or for other OS platforms. Also, the detection of such OS structure modifications can be performed during a dynamic analysis of a malware sample to provide further information (e.g., in addition to detecting dynamically generated system functions in memory during dynamic/runtime analysis of the malware sample) for determining whether the malware sample exhibits suspicious or malicious behaviors as further described below.

Concurrent Search for Function Pointers in Process Memory for Detecting Malware Via Scanning for Dynamically Generated Function Pointers in Memory As discussed above, malware can conceal/obfuscate its malicious activity/functionality by dynamically resolving function pointers (e.g., system function pointers). The disclosed techniques include monitoring and comparing snapshots of memory to detect changes, for example, in process memory. However, given the number of function pointers (e.g., 10,000 to 20,000 WINAPI pointers for Windows OS environment/platform) that may be searched for to identify such potential malicious activity/functionality, there is a need to provide for a more efficient search of process memory. As described below, a more efficient concurrent search technique for searching for system functions in process memory is disclosed, in which instead of searching for one system function pointer at a time which is inefficient and time consuming, all process memory is searched using a concurrent search algorithm to reduce the search complexity by an order of magnitude to facilitate a significantly more efficient and computationally less expensive operation (e.g., a scan of the 10,000 to 20,000 WINAPI pointers can be performed in less than one second) as further described below.

Figure 6:
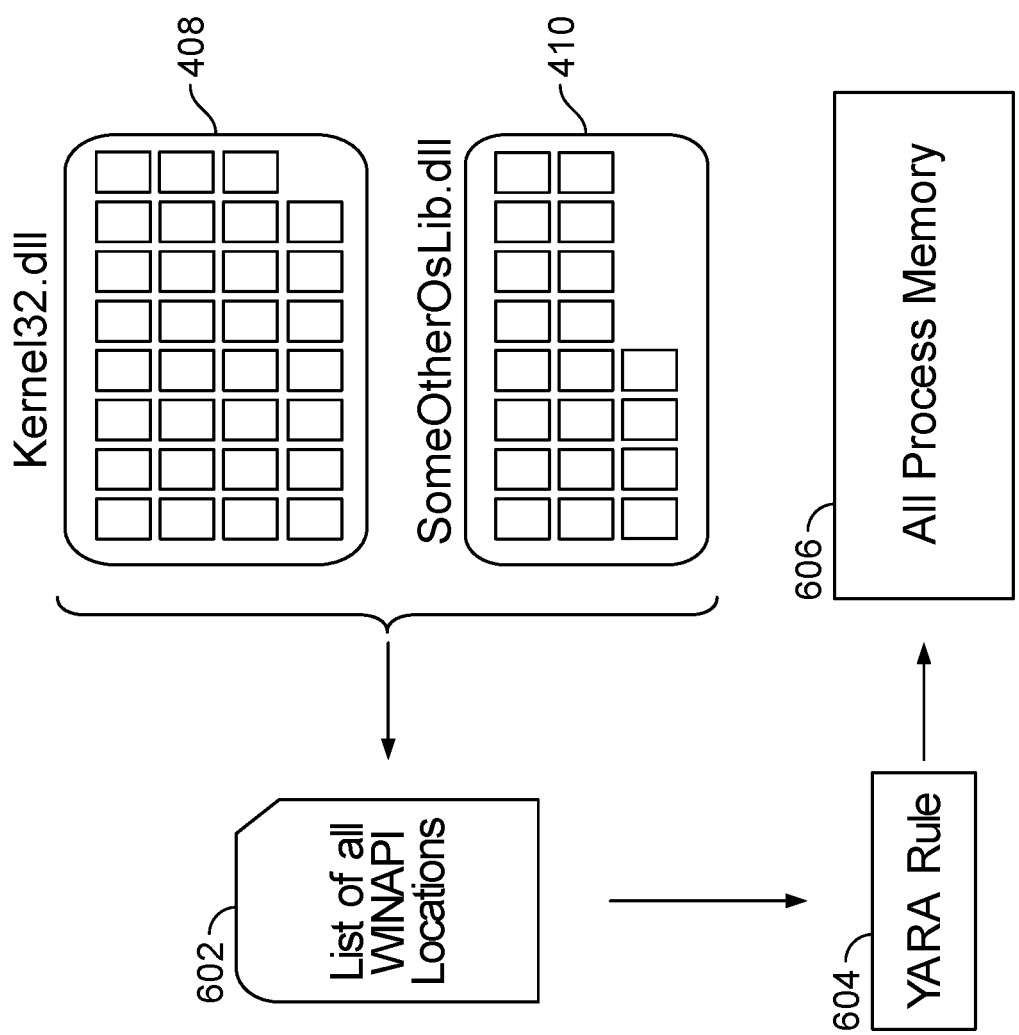
FIG. 6 illustrates a functional view of a concurrent search for function pointers in process memory of a sandbox at runtime in a malware analysis system for detecting OS structure modifications in memory in accordance with some embodiments.

FIG. 6 illustrates a functional view of a concurrent search for function pointers in process memory of a sandbox at runtime in a malware analysis system for detecting OS structure modifications in memory in accordance with some embodiments. For example, the sandbox can implement an instrumented VM environment for performing detection of malware via scanning for dynamically generated function pointers in memory, such as similarly described above with respect to FIGS. 1-3. In one embodiment, FIG. 6 is an example implementation of concurrent search component 350 of FIG. 3.

Referring to FIG. 6, exports from all OS libraries in memory are parsed, which in this example, includes the following OS libraries: Kernel32.dll 408 and SomeOtherOSLib.dll 410, to generate a list of all WINAPI locations in process memory as shown at 602. In this example implementation, these function locations in memory are flattened into rules that can be used to efficiently search all process memory, and specifically, the list of function locations are condensed into a single tree-like structure using a YARA rule as shown at 604 (e.g., which can be implemented using the concurrent search functionality in the YARA library, available at http://virustotal.github.io/yara/, or other string search techniques can be implemented for solving this problem of finding N function pointer byte strings within a memory segment of length M, such as the Aho-Corasick string search as described at https://en.wikipedia.org/wiki/Aho Corasick_algorithm or the Karp-Rabin string search as described at https://en.wikipedia.org/wiki/RabinKarp algorithm). Finally, YARA rule 604 can then be used to find all references to all functions with a single pass across all process memory 606.

Figure 7:
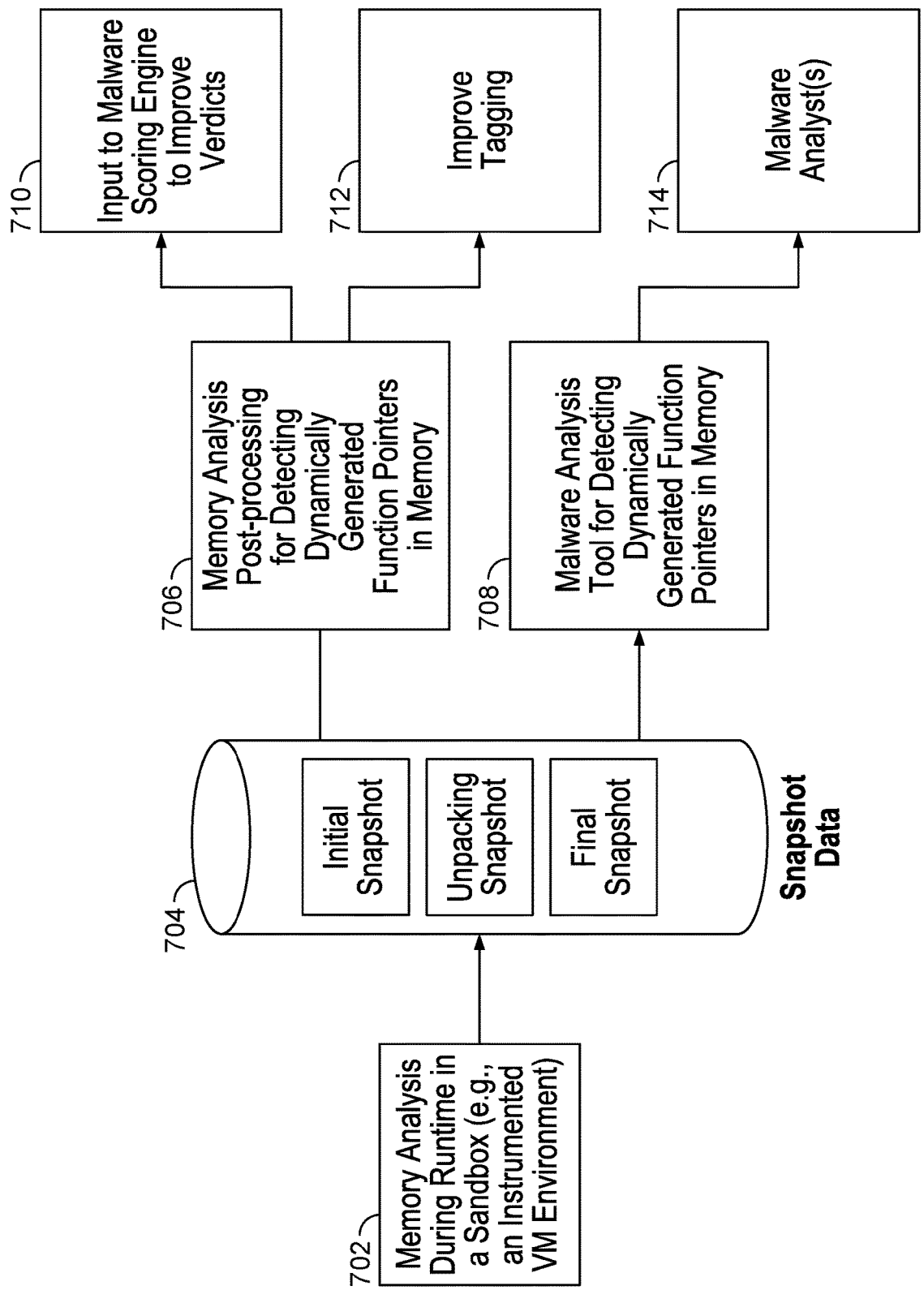
FIG. 7 illustrates a security solution architecture for applying the detection of dynamically generated function pointers in memory in accordance with some embodiments.

Security Solutions Architecture for Applying the Detection of Dynamically Generated Function Pointers in Memory FIG. 7 illustrates a security solution architecture for applying the detection of dynamically generated function pointers in memory in accordance with some embodiments. For example, the sandbox memory analysis, snapshotting of memory, and memory analysis post-processing described below with respect to FIG. 7 can be implemented using an instrumented VM environment for performing detection of malware via scanning for dynamically generated function pointers in memory, such as similarly described above with respect to FIGS. 1-3.

Referring to FIG. 7, a memory analysis during runtime in a sandbox (e.g., an instrumented VM environment) is performed as shown at 702 to generate snapshots of memory (e.g., including an initial snapshot of process memory, an unpacking snapshot of process memory, and a final snapshot of process memory) stored as snapshot data (e.g., in a data store, such as a database or other data store) as shown at 704. A security service (e.g., the WildFire™ cloud-based malware analysis environment provided by Palo Alto Networks® or another security service can implement a memory analysis post-processing package) can perform automated memory analysis post-processing to detect dynamically generated function pointers in memory 706 based on a comparison of the process memory snapshots as similarly described above.

In an example implementation, the memory analysis post-processing can be provided as an input to a malware scoring engine to improve verdicts 710 (e.g., a scoring engine used by the WildFire™ cloud-based malware analysis environment provided by Palo Alto Networks® or another security service can modify a scoring engine for malware verdicts based on information associated with the detection of dynamically generated function pointers in memory and/or other detected changes in memory, such as OS structure modifications and/or memory permission changes, as similarly described above).

In another example implementation, the memory analysis post-processing can be provided as an input to a malware scoring engine to improve tagging 712 (e.g., tagging used by the AutoFocus' cloud-based contextual threat intelligence service accelerates analysis, correlation and prevention workflows solutions provided by Palo Alto Networks® or another security service that provides a similar solution). For example, tags can be generated for patterns that can be detected using the disclosed memory analysis techniques, such as the following example patterns: (1) if a given tuple of WINAPI function pointers are detected in heap memory; (2) if N pages are modified to be executable inside the executable image; and/or (3) if the "FullDLLName" field of an LDR MODULE structure is modified. As such, tagging can be improved using various behaviors and/or artifacts that can be detected using the disclosed techniques, which can facilitate detection of malware and/or may be applied to associate malware families based on similar patterns.

As also shown in FIG. 7, a malware analyst(s) 714 can utilize a malware analysis tool 708 that can also process the snapshot data to facilitate analysis and detection of dynamically generated function pointers in memory based on a comparison of the process memory snapshots as similarly described above. In an example implementation, the malware analysis tool includes an interface (e.g., a Graphical User Interface (GUI)), such as further described below.

Interfaces for Detecting Malware Via Scanning for Dynamically Generated Function Pointers in Memory In one embodiment, a tool that implements the disclosed techniques for detecting malware via scanning for dynamically generated function pointers in memory includes an interface (e.g., a GUI) as similarly described above. For example, the interface can provide graphical visualizations to illustrate the changes in memory identified during execution of a malware sample in a virtualized malware analysis environment, such as further described below.

Figure 8A:
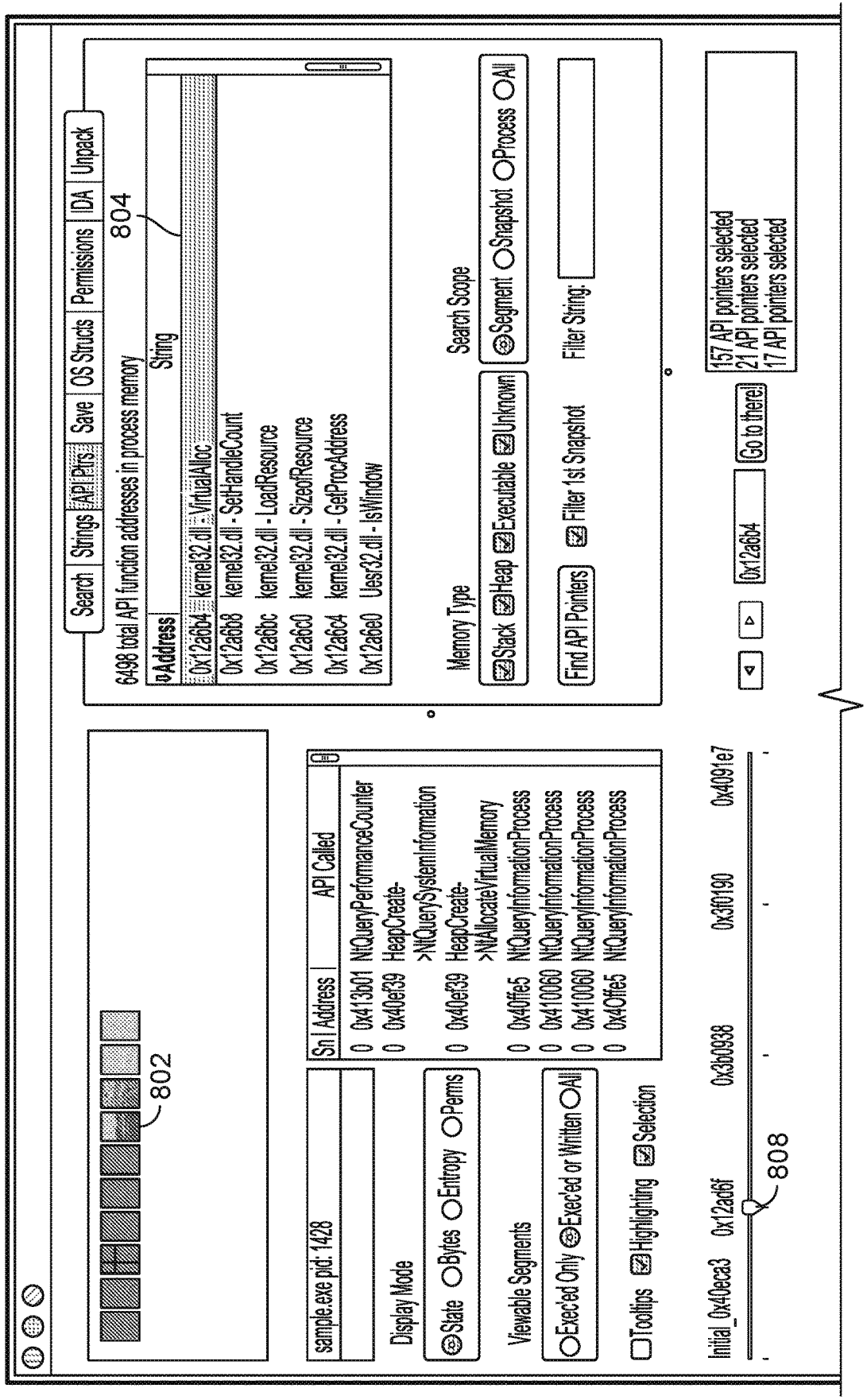
FIGS. 8A-B illustrate an embodiment of a graphical user interface (GUI) that includes visualizations for detecting malware via scanning for dynamically generated function pointers in memory during monitoring of a malware sample.
Figure 8A:
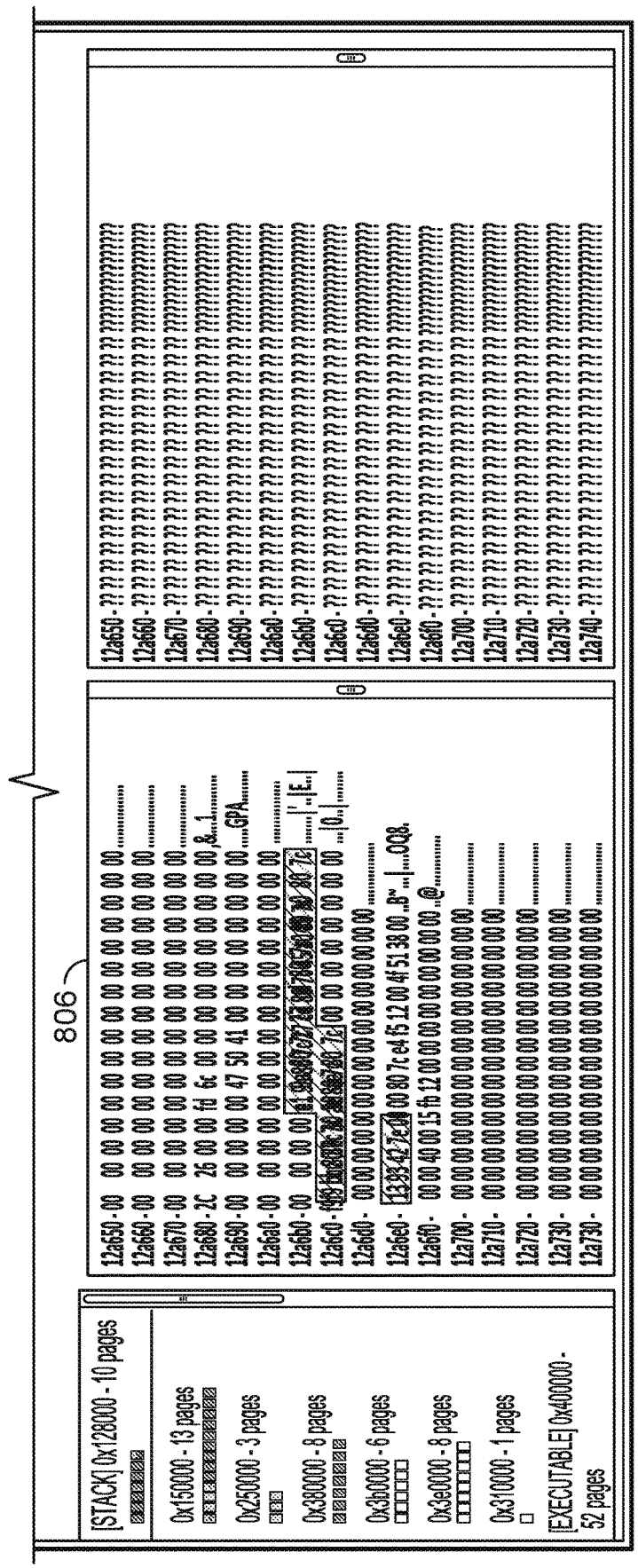
Figure 8B:
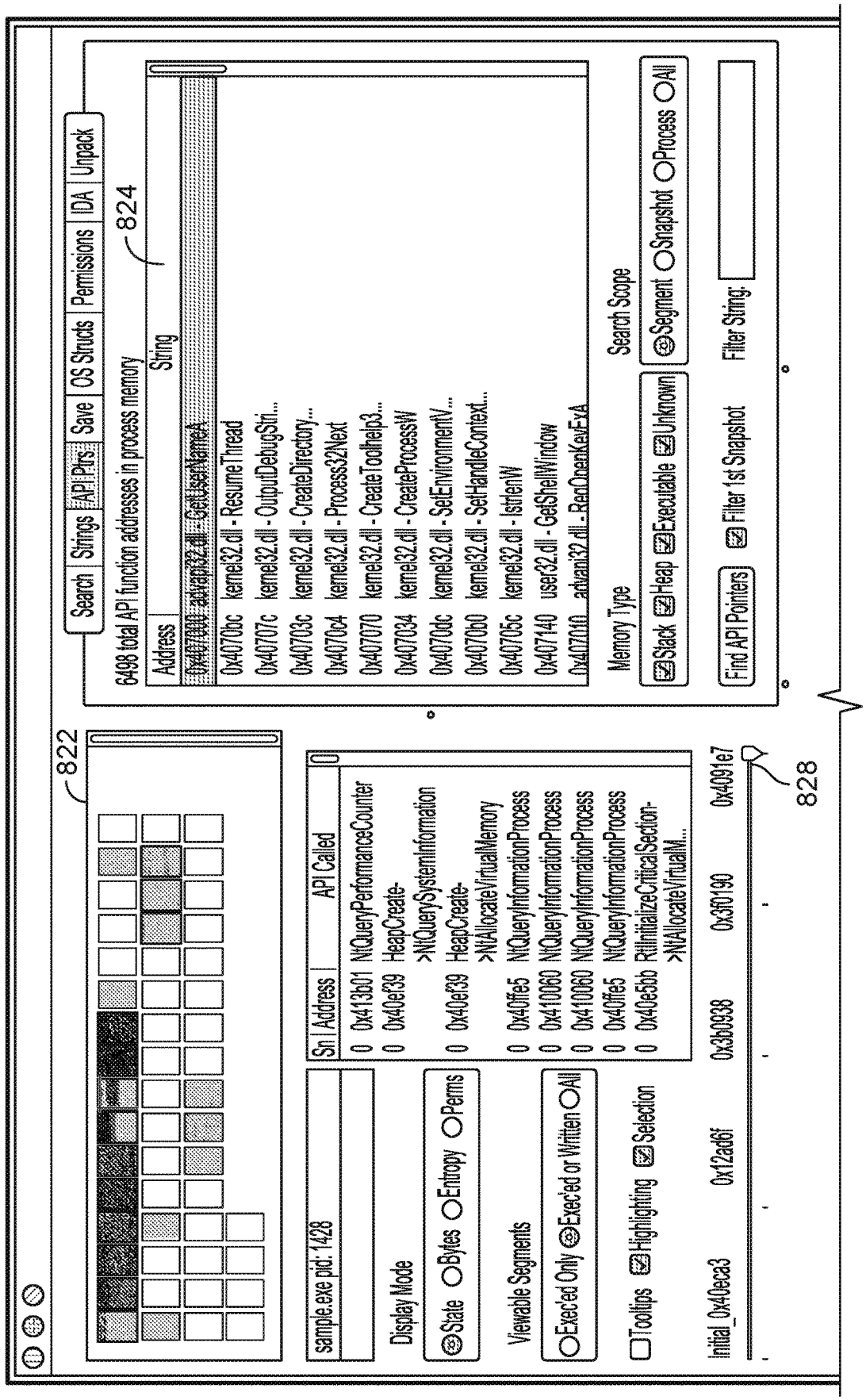
Figure 8B:
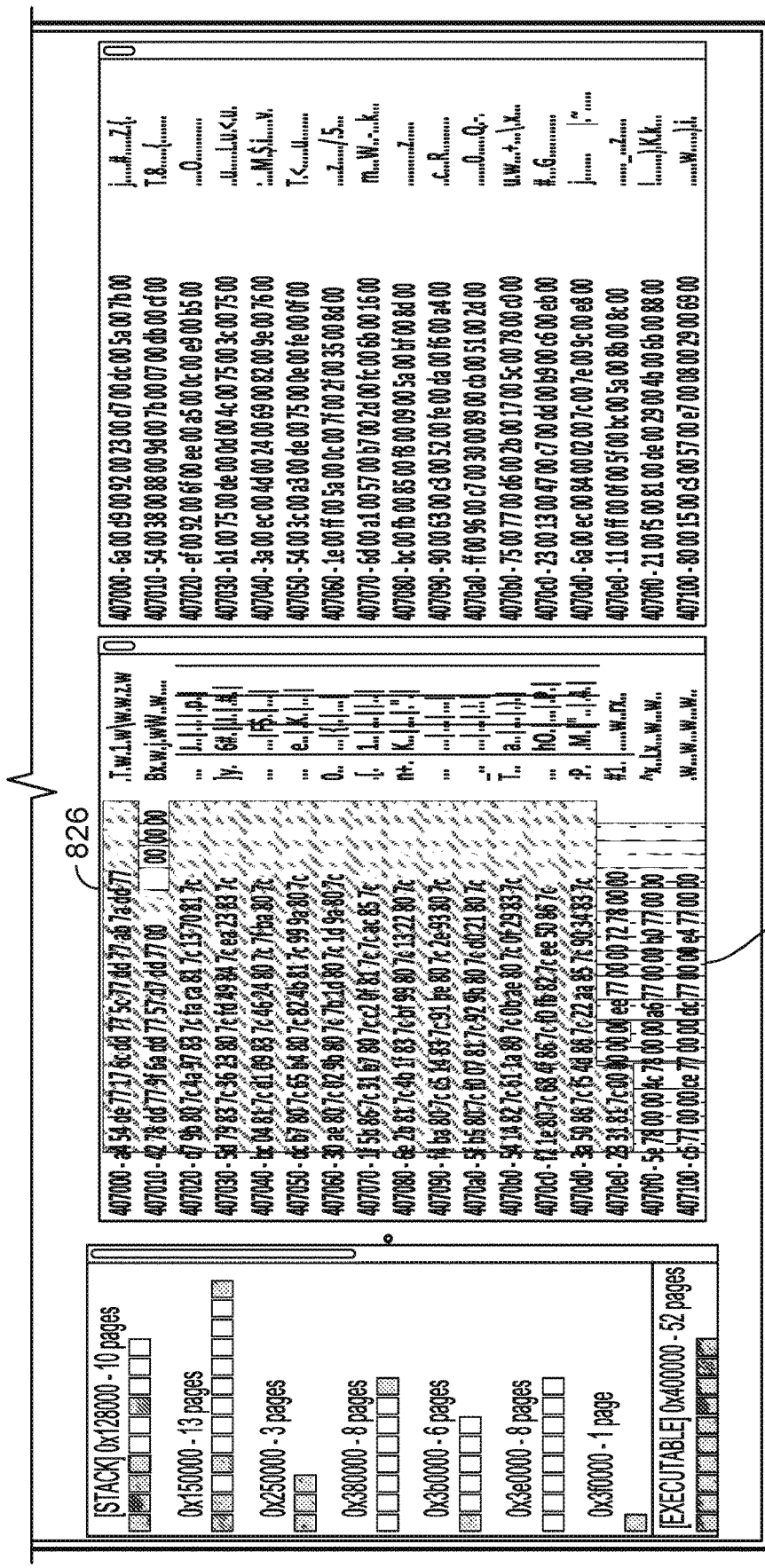

FIGS. 8A-B illustrate an embodiment of a graphical user interface (GUI) that includes visualizations for detecting malware via scanning for dynamically generated function pointers in memory during monitoring of a malware sample. Specifically, FIGS. 8A and 8B provide visual views of dynamically generated function pointers detected in process memory during execution of the same malware sample (e.g., filtering all the process memory in each snapshot for function/API pointers). In various embodiments, these GUI visualizations are generated and output by system 300 (examples of which include malware analysis system 132 and cloud security service 122 as shown in FIG. 1).

Referring to FIG. 8A, a GUI visualization of a malware sample analysis at time $t_1$ shows that a loaded executable overwrites what was loaded from disk (e.g., in this example, after deobfuscation or unpacking of malware binary code that was in the malware sample). As similarly discussed above, the malware analysis process begins at initial time $t_0$ (e.g., when candidate malware (e.g., malware sample) is received and emulated execution of the malware sample begins (before execution of a first instruction of the malware sample) using a dynamic analysis engine (310) and/or other components (320, 326, 330, 336, 340, 350, and 360) as shown in FIG. 3). In this example GUI visualization, pages in memory are shown, such as at 802 indicating a modified page in memory. The pages associated with the process are snapshotted and each page is stored in a distinct file, which can be cached using a table for identifying the pages in memory and associated snapshots of each of those pages (e.g., which can be stored in a page cache (326)). An initial snapshot of all of the pages in memory associated with the process at initial time $t_0$ is created and cached to provide a baseline for the contents in memory for the loaded and executed sample (e.g., for comparison during later points in time of execution of the sample to identify a subset (if any) of the pages in memory that are modified after initial time $t_0$ and after intercepted/hooked system function/API call events based on a comparison with the contents of the respective pages in the initial or previous snapshot as further described below). Also, the events (e.g., system function/API calls) that are monitored are shown in the interface, such as shown at 804 and 806 as further discussed below (e.g., in some cases, selected events can trigger new snapshots of memory during a monitoring of the malware sample execution as described below).

At a subsequent point in execution time $t_1$ (at address: 0x12ad6f) as shown at 808, the sample performed unpacking of executable code in memory as shown at 802. As shown in the graphical visualization by the highlighted perimeters of the rectangles for a subset of the monitored pages in memory, using the disclosed techniques described above and below (e.g., detecting dynamically generated function pointers), the malware analysis system determined to perform another snapshot of memory, and the malware analysis system detected changes in content of each of these pages in memory since the initial time $t_0$ based on a comparison with the contents of the respective pages in the initial or previous snapshot. These detected changes in content of each of these pages in memory since the initial time $t_0$ indicate a potential unpacking behavior associated with the sample during emulated execution. Generally, such unpacking (e.g., decompressing/decrypting and loading) of executable code in memory (as opposed to a disk executable, that would simply load the same executable stored on disk into memory) is suspicious/potentially malware behavior.

Specifically, the visualization shown in FIG. 8A indicates that various pointers were observed on the stack, such as shown in the selected API function at 804. Further analysis of the malware would conclude that these function pointers listed in the visualization were used by the shellcode also found on the stack to decode and load the malicious payload on top of the original executable in memory as shown with modified pages at 802 and the modified contents of the page after the selected API function at 804 was called as shown at 806. However, given the presence of these API pointers at this location along with the presence of shellcode on the stack, this functionality can also be automatically determined without having to perform manual reverse engineering.

Referring to FIG. 8B, at a subsequent point in execution time $t_1$ (at address: 0x4091e7) as shown at 828, for the selected API function as shown at 824, the sample performed unpacking of executable code in memory as shown at 822. As shown in the graphical visualization by the highlighted perimeters of the rectangles for a subset of the monitored pages in memory, using the disclosed techniques described above and below (e.g., detecting dynamically generated function pointers in memory), the malware analysis system determined to perform another snapshot of memory, and the malware analysis system detected changes in content of each of these pages in memory since the initial time $t_0$ based on a comparison with the contents of the respective pages in the initial or previous snapshot. These detected changes in content of each of these pages in memory since the initial time $t_0$ indicate a potential unpacking behavior associated with the sample during emulated execution. Generally, such unpacking (e.g., decompressing/decrypting and loading) of executable code in memory (as opposed to a disk executable, that would simply load the same executable stored on disk into memory) is suspicious/potentially malware behavior.

Specifically, the visualization shown in FIG. 8B indicates the dynamically generated function pointers detected in memory as shown at, for example, 830 and indicated by the highlighted/shaded portions of the contents of memory in the unpacked memory segment shown at 826. For example, the visualization shown in FIG. 8B illustrates how the tool allows a user (e.g., a malware/security analyst) to quickly see what functionality was present in each component that was present in each type of memory (e.g., stack, heap, executable, and/or other/unknown). As another example, this information can also be processed to automatically derive what types of functionality are present in different malware components even if such are not executed in the sandbox/instrumented VM environment (e.g., sandbox evasion, insufficient VM configuration, buggy malware, etc.) to facilitate automatically determining the intent of the malware component(s) and to flag, score, and/or tag it accordingly.

While packing/obfuscation approaches are often associated with the distribution of malware binaries, it should be noted that there are legitimate commercial software vendors that utilize various packing/obfuscation approaches to distribute their software binaries (e.g., Google and various other commercial software vendors may use packing/obfuscation approaches to distribute their software binaries to protect the intellectual property in their code and make it more difficult to reverse engineer their code). However, such legitimate commercial software vendors typically sign their code, and signed code from a trusted vendor can generally be trusted as such vendors are not using packing/obfuscation approaches to distribute malware binaries.

Various other interfaces can similarly provide graphical visualizations or other interfaces for the disclosed techniques for detecting malware via scanning for dynamically generated function pointers in memory. The example GUI interface provides an intuitive GUI interface for a security analyst to efficiently identify the dynamically generated function pointers in unpacked/deobfuscated malware code to focus their analysis and/or for generating a malware signature, generating a tag for the malware sample, and/or performing other remedial actions as similarly described above and further described below.

As will be apparent, while the above-described embodiments are described with respect to monitored samples executing in Microsoft Windows® OS platform environments, the disclosed techniques can be similarly applied to various other OS platform environments, such as Apple Mac® OS, Linux, Google Android® OS, and/or other platforms, as would now be apparent to one of ordinary skill in the art in view of the disclosed embodiments.

Figure 9:
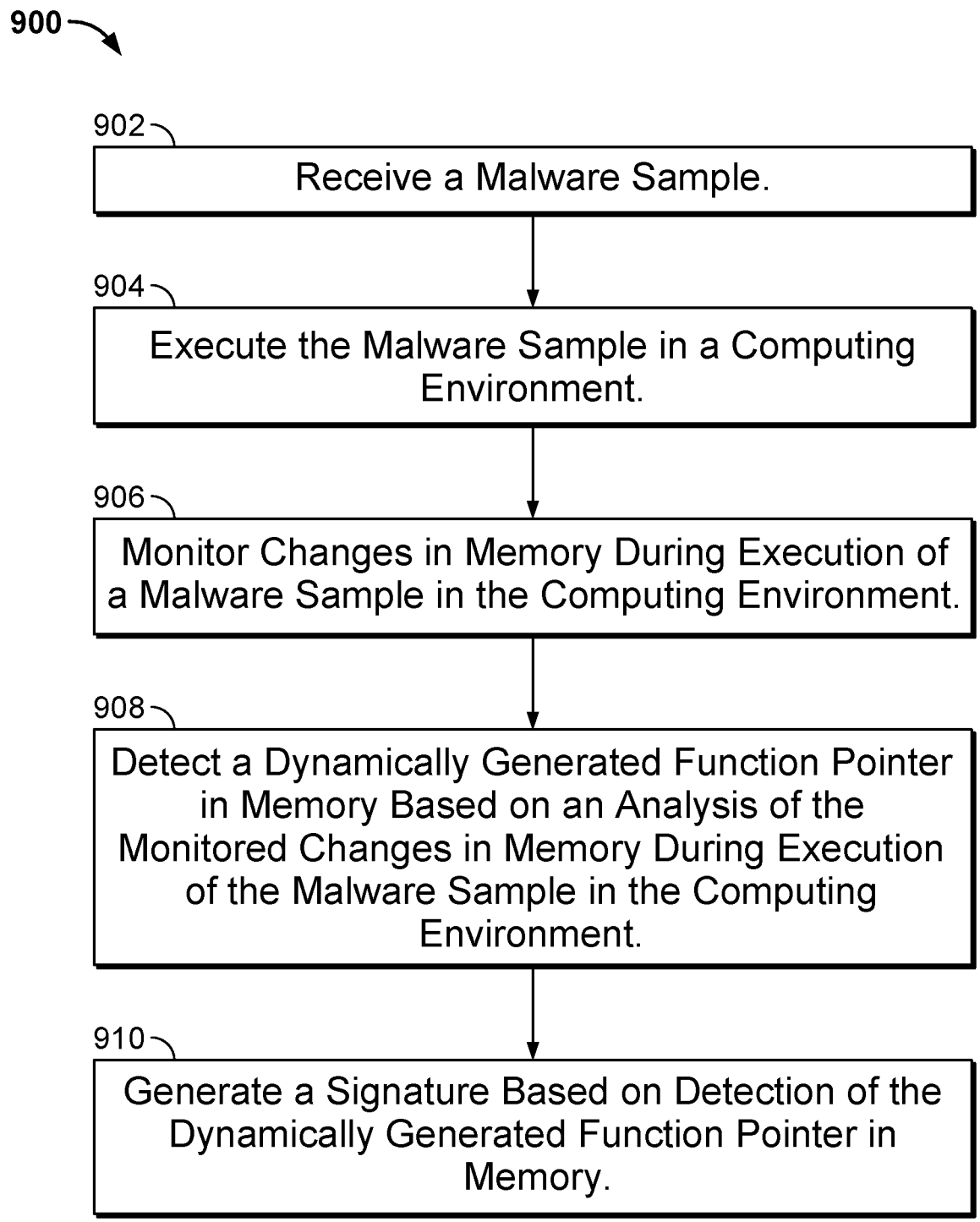
FIG. 9 illustrates an embodiment of a process for detecting malware via scanning for dynamically generated function pointers in memory.

Processes for Detecting Malware Via Scanning for Dynamically Generated Function Pointers in Memory FIG. 9 illustrates an embodiment of a process for detecting malware via scanning for dynamically generated function pointers in memory. In various embodiments, process 900 is performed by system 300 (examples of which include malware analysis system 132 and cloud security service 122 as shown in FIG. 1). The process begins at 902 when a malware sample (e.g., candidate malware) is received. As one example, candidate malware is received at 902 when an email (including an attachment) is received by data appliance 102 from system 120. As another example, data appliance 102 can be configured to transmit the attachment to service 122 for analysis. In that scenario, the candidate malware is received by service 122 at 902. As yet another example, candidate malware can be received at 902 as part of a batch operation (e.g., where cloud security service 122 receives a variety of malware samples over a period of time and a batch of received samples is provided to virtual machine server 124 for processing with virtual machine server 124 receiving the batch at 902). Further, the batch operation can be repeated (e.g., on the same set of samples or on a set that includes at least some of the same samples as previous batches).

At 904, the malware sample is executed in a computing environment. For example, the computing environment can be implemented to initialize a virtual machine instance (e.g., an instrumented virtual environment, such as similarly described above with respect to 112 and 124 of FIG. 1). The virtual environment is instrumented, as applicable, such that behaviors observed while the application is executing are logged and/or monitored (e.g., intercepting/hooking system call/API events, also referred to herein as system function events) as similarly described above.

At 906, monitoring changes in memory after a system call event during execution of a malware sample in the computing environment is performed. For example, a first snapshot (e.g., initial snapshot) and a second snapshot (e.g., interim or final snapshot) can be compared to detect changes in memory during the execution of the malware sample in the computing environment, which can then be utilized to detect dynamically generated function pointers in memory as further discussed below.

In one embodiment, another snapshot of all of the plurality of pages in memory associated with the process is performed at subsequent time $t_i$, after a predetermined period of time (e.g., after a predetermined period of time or after completion of execution of the malware sample) or after a system call event if any return address in a call stack points to a memory address that has changed since the initial snapshot (e.g., the call stack can be inspected to determine whether any return address in the call stack points to a memory address that has changed since the first/previous image of memory was performed, and if so, another snapshot can be performed which can be utilized to identify a subset of the pages in memory that have changed since the first/previous image of memory). As a result, the disclosed techniques of snapshotting in memory based upon system call events can efficiently and effectively facilitate automatic detection of unpacking of code in memory during execution of the malware sample in the computing environment.

At 908, detecting a dynamically generated function pointer in memory is performed based on an analysis of the monitored changes in memory during execution of the malware sample for a predetermined period of time in the computing environment. For example, the disclosed techniques for searching the pages in memory that were modified during execution of the malware sample for system APIs/functions can be performed to detect any dynamically generated function pointers as similarly described above.

In one embodiment, the malware code in memory associated with the detected dynamically generated function pointer is submitted for dynamic analysis to determine whether such exhibits suspicious or malicious behavior(s). For example, an extracted payload from the deobfuscated/unpacked code (e.g., including the malware code in memory associated with the detected dynamically generated function pointer) can be submitted for dynamic analysis (e.g., using the dynamic analysis engine (310)) to determine whether such exhibits suspicious or malicious behavior(s).

At 910, a signature is automatically generated for the malware sample based on detection of the dynamically generated function pointer in memory, in which the malware sample was determined to be malicious. For example, an extracted payload from the deobfuscated/unpacked code can be submitted for dynamic analysis (e.g., using the dynamic analysis engine (310)) to generate new signatures (e.g., as well as applying existing signatures, such as signatures based on YARA rules).

Remedial Actions

As explained above, various remedial actions can be performed using the disclosed techniques for detecting malware via scanning for dynamically generated function pointers in memory. For example, signatures can be automatically generated based on the malware binaries identified in the automatically unpacked code/binaries during malware execution in the malware analysis environment (e.g., performing a static analysis of the unpacked code/binaries to generate pattern-based signatures, such as signatures based on YARA rules). The signatures can be distributed to security devices (e.g., security/firewall appliances), host security software/agents, and/or a security service for enforcement based on the signature (e.g., applied to deobfuscated/unpacked payloads).

As another example, the extracted payload from the deobfuscated/unpacked code/binaries can be submitted for dynamic analysis (e.g., using the dynamic analysis engine (310)) to generate new signatures such as dynamic/behavior signatures (e.g., as well as applying existing signatures, such as signatures based on YARA rules).

In another example, the disclosed techniques can be applied to cluster malware families that may utilize different obfuscation or packing approaches to conceal identical or similar malware code/binaries. The automatically unpacked code/binaries detected during malware execution can be compared across malware samples to facilitate clustering of such malware families (e.g., identifying malware families using YARA rules or similar techniques).

As yet another example, the memory analysis post-processing can be provided as an input to a malware scoring engine to improve tagging (e.g., tagging used by the Auto-Focus™ cloud-based contextual threat intelligence service accelerates analysis, correlation, and prevention workflows solutions provided by Palo Alto Networks® or another security service that provides a similar solution). For example, tags can be generated for patterns that can be detected using the disclosed memory analysis techniques, such as the following example patterns: (1) if a given tuple of WINAPI function pointers is detected in heap memory; (2) if N pages are modified to be executable inside the executable image; and/or (3) if the "FullDLLName" field of an LDR MODULE structure is modified. As such, tagging can be improved using various behaviors and/or artifacts that can be detected using the disclosed techniques, which can facilitate detection of malware and/or may be applied to associate malware families based on similar patterns.

Deduplicating Malware

Signature-based detection of malware is prevalent in the security industry, and in response, malware authors are increasingly "repacking" their malware to thwart easy detection. In particular, malware authors will employ data obfuscation and other techniques that will result in programs that have identical (malicious) functionality (and are typically created using identical source code) having very different executable files, which will yield very different signatures (e.g., different MD5, SHA-256, etc. signatures).

Suppose the author of malware 130 repacks the malware three times, sending different copies of malware 130 to each of clients 104, 106, and 108, respectively. The functionality of each copy will be the same (e.g., contact C&C server 150 and execute a cryptocurrency mining program or some other nefarious activity), but to appliance 102, each copy appears to be a different attachment (i.e., each of the three files would have a respective different MD5 or other signature). Further suppose that appliance 102 does not have any signatures stored on it for any of the three received copies of malware 130 (i.e., the MD5 or other signatures of the three copies of malware 130 are not present on any blacklists or whitelists stored on appliance 102), and also that security service 122 (when polled by appliance 102) also does not have any information pertaining to the three attachments. Appliance 102 might accordingly transmit each of the three attachments to security service 122 for processing, before allowing the messages from system 120 to reach any of clients 104-108 (if at all). In this example, security service 122 could wind up performing triple the work (i.e., performing a full set of static/dynamic analysis on each of the three copies of malware 130) than it otherwise would if the author had not employed repacking. In particular, if the author had not employed repacking, service 122 could have evaluated the first copy of malware 130 and reached a determination that the sample was malicious. Where the second and third samples are identical files (i.e., with identical signatures), service 122 would not need to examine the other two copies, and they would instead be flagged (e.g., by platform 102, or service 122, as applicable) as duplicates. However, the second and third copies, if repacked, will appear to be unique samples—and thus potentially require full analysis as well.

Once the second sample has been identified as a duplicate of the first sample (e.g., by a deduplication module 318, or coordinator 304, or another component, as applicable), a variety of actions can be taken. As a first example, additional processing of the second sample can be terminated, saving resources. As a second example, malware samples can be tied back to their sources (e.g., using database 316). For example, suppose the first and second samples are received (e.g., by security service 122) from two different banking institutions. Using conventional signature-based approaches, the two samples would have two different signatures, and could potentially have been created by two different authors. Once it is discovered that the two samples when deobfuscated/unpacked include identical malware binaries, an inference can be made that the author of both samples is the same (and, that the same entity is attacking both banks).

Figure 10:
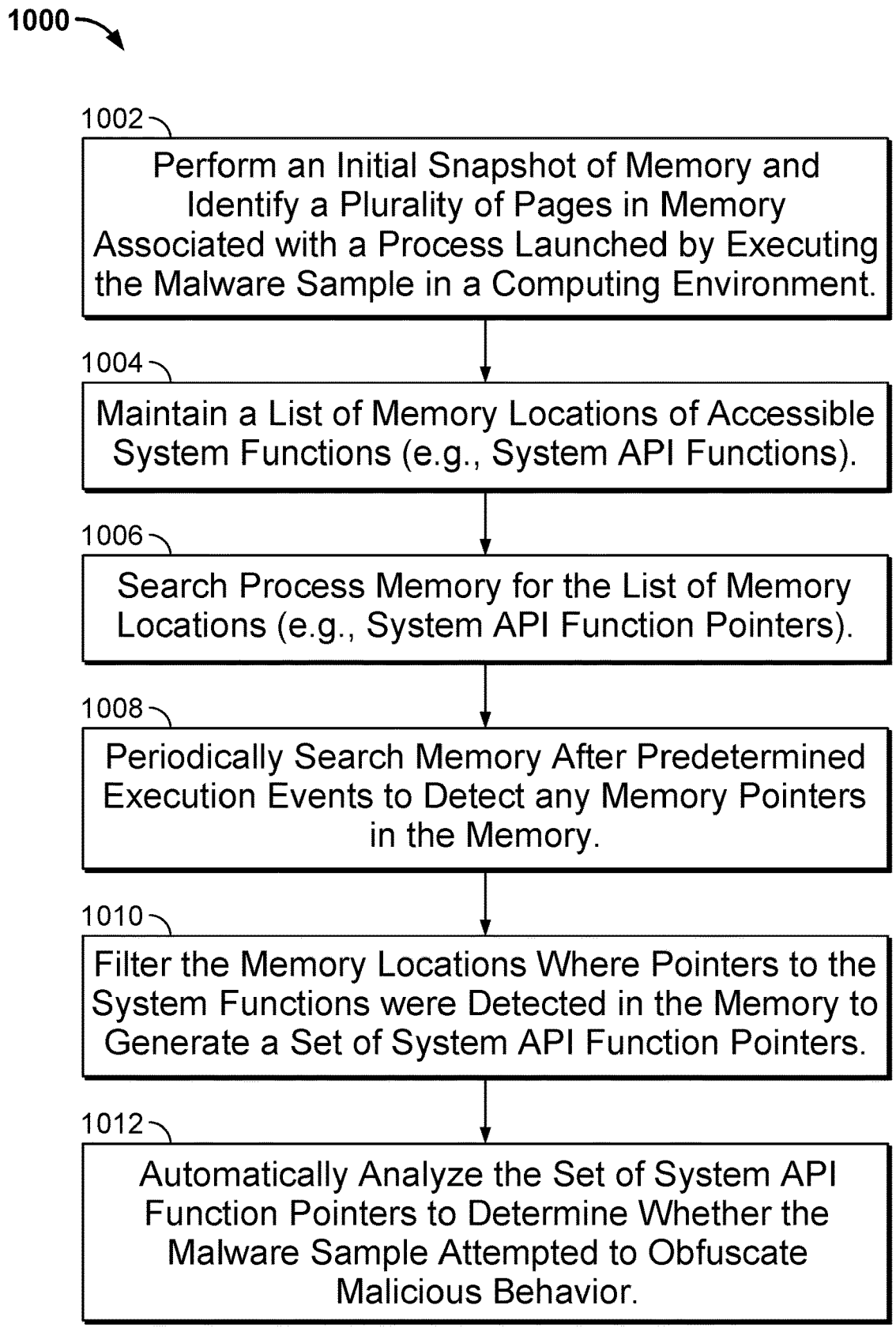
FIG. 10 illustrates another embodiment of a process for detecting malware via scanning for dynamically generated function pointers in memory.

FIG. 10 illustrates another embodiment of a process for detecting malware via scanning for dynamically generated function pointers in memory. In various embodiments, process 1000 is performed by system 300. The process begins at 1002 when a process (e.g., a malware sample or a monitored process on a host device) is monitored (e.g., using the memory monitor (340)) including performing an initial snapshot of memory (e.g., process memory) and identifying a plurality of pages in memory associated with the process launched by executing the malware sample in a computing environment.

At 1004, maintaining a list of memory locations of accessible system functions (e.g., system API functions) is performed. For example, as the program/malware sample under analysis executes, every time a new system library (e.g., or a .dll in the case of a VM/host machine executing the Microsoft Windows OS) is mapped into memory, the location of all the functions that the program can call is determined/parsed as similarly described above.

At 1006, search process memory for the list of memory locations (e.g., system API function pointers) is performed. For example, each of these memory locations (e.g., system API function pointers) can be flattened into rules (e.g., YARA rule (604)) that can then be used to efficiently search all process memory. In this example implementation, instead of searching one pointer at a time which is inefficient and time consuming, all memory is searched using the concurrent search (350) to reduce the search complexity by an order of magnitude to facilitate a significantly more efficient and computationally less expensive operation (e.g., as discussed above, a scan of the 10,000 to 20,000 WINAPI pointers can be performed in less than one second) as similarly described above.

At 1008, periodically searching memory is performed after predetermined execution events to detect any memory pointers in the memory. For example, another snapshot can be performed and memory can be searched whenever certain execution events occur (e.g., system call/API events, unpacked code is executed (in which unpack checks can be performed whenever a system call is detected, such that there can be 2-N snapshots performed), or when the process terminates, as well as at the start of the process as described above), and the flattened search rule can be used to detect any memory pointers (e.g., including system API function pointers) in the memory (e.g., which can then be cached/stored in the pointer cache (336)). In this example, the type of memory, such as heap, stack, PE Image (e.g., in the case of a VM/host machine executing the Microsoft Windows OS), or unknown, is also tracked as similarly described above.

At 1010, filtering the memory locations where pointers to the system functions were detected in the memory is performed to generate a set of system API function pointers. For example, the filtering can be implemented using the function filter (360) to disregard/filter out any pointers that existed in the original binary of the program/malware sample (e.g., were present in the initial snapshot of memory) in order to focus the analysis on dynamically generated function pointers that the program/malware sample may be attempting to conceal/obfuscate to avoid malware detection.

In one embodiment, the set of system API function pointers can also be filtered based on a predetermined set of system functions (e.g., to extract from the list any interesting and useful system functions typically associated with malicious behavior), such as using one or more of the example system functions for the Microsoft Windows OS platform (e.g., that are commonly utilized by malware) as provided in Appendix-A. In addition, a set of blacklists can also be utilized in combination with the interesting functions list to more effectively perform the filtering operation, in which the blacklists indicate how system function pointers are commonly utilized by legitimate software/non-malware in memory (e.g., on the heap, stack, and/or unknown memory pages), such as the set of blacklists provided in Appendix-B.

At 1012, automatically analyze the set of system API function pointers to determine whether the malware sample attempted to conceal/obfuscate malicious behavior (e.g., to determine what suspicious/malicious program behaviors were being hidden by the program/malware sample attempting to conceal/obfuscate such system API function pointers by dynamically generating such system API function pointers during runtime) as similarly described above.

In one embodiment, the executable code in memory associated with the detected dynamically generated function pointer(s) is submitted for static analysis, dynamic analysis, and/or both static and dynamic analysis to determine whether such exhibits suspicious or malicious behavior(s). For example, an extracted payload from the deobfuscated/unpacked code (e.g., including the executable code in memory associated with the detected dynamically generated function pointer(s)) can be submitted for dynamic analysis (e.g., using the dynamic analysis engine (310)) to determine whether such exhibits suspicious or malicious behavior(s) and for static analysis (e.g., using the static analysis engine (306)) to determine whether such executable code can be determined to be associated with malware.

In one embodiment, techniques for detecting malware via scanning for dynamically generated function pointers in memory also include automatically detecting memory permission changes. For example, memory permission changes can be detected based on a comparison of memory snapshots as similarly described above.

In one embodiment, techniques for detecting malware via scanning for dynamically generated function pointers in memory also include automatically detecting OS structure modifications. In an example implementation, a list of the types of OS structure modifications in memory that are detected for a Microsoft Windows OS (e.g., Microsoft Windows version 7) includes one or more of the following:

a. PEB_BEING_DEBUGGED_FLAG_SET: The software has set the "being debugged" flag in the OS structures. This is a common malware trick to determine if the flag in the OS structures matches the output of the WINAPI funcs to check whether they are being debugged.
b. PEB_IMAGE_BASE_ADDRESS_MODIFIED: The Image Base address in the Process Environment Block was changed.
c. LDR_MODULE_FULL_DLL_NAME_MODIFIED: The Full Dll Name field in an LDR MODULE structure was changed.
d. LDR_MODULE_BASE_ADDRESS_MODIFIED: The Base Address field in an LDR MODULE structure was changed.
e. LDR_MODULE_SIZE_OF_IMAGE_MODIFIED: The Size of Image field in an LDR MODULE structure was changed.
f. LDR_MODULE_ENTRYPOINT_MODIFIED: The Entry Point field in an LDR MODULE structure was changed.
g. MAIN_PE_IMAGE_UNHOOKED_FROM_MODULE_LIST: The main executable image was unhooked from the module list.
h. MODULE_REMOVED_FROM_MODULE_LIST: A module was removed from the LDR MODULE list.
i. MODULE_LISTS_DIFFERENT_SIZES: There are three lists of LDR MODULE structures that should be the same size. In this case, a discrepancy was detected.

In addition, various other types of OS structure modifications in memory can be detected for the Microsoft Windows OS (e.g., Microsoft Windows version 7) or for other Microsoft Windows OS versions and/or for other OS platforms. Also, the detection of such OS structure modifications can be performed during a dynamic analysis of a malware sample to provide further information (e.g., in addition to detecting dynamically generated system functions in memory during dynamic/runtime analysis of the malware sample) for determining whether the malware sample exhibits suspicious or malicious behaviors as further described herein.

In an example implementation, techniques for detecting malware via scanning for dynamically generated function pointers in memory include the following operations that can be performed in using an instrumented virtualized/VM environment or on a host machine (e.g., using an agent or other software executed on the host machine for monitoring execution of malware on the host machine).

Figure 11:
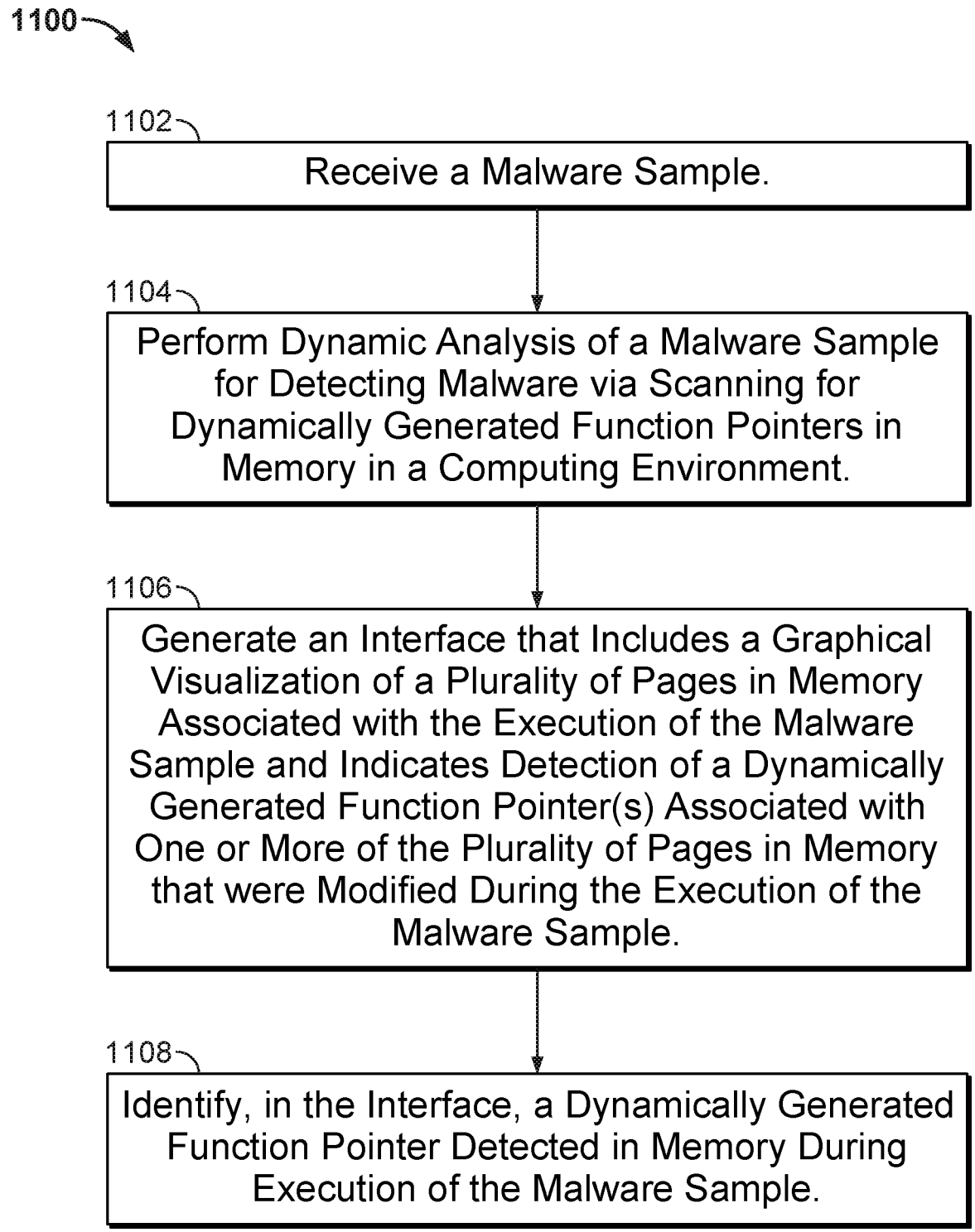
FIG. 11 illustrates an embodiment of a process for generating an interface for detecting malware via scanning for dynamically generated function pointers in memory.

Processes for Generating an Interface for Efficient Program Deobfuscation Through System API Instrumentation FIG. 11 illustrates an embodiment of a process for generating an interface for detecting malware via scanning for dynamically generated function pointers in memory. In various embodiments, process 1100 is performed by system 300. The process begins at 1102 when a malware sample (e.g., candidate malware) is received. As one example, candidate malware is received at 1102 when an email (including an attachment) is received by data appliance 102 from system 120. As another example, data appliance 102 can be configured to transmit the attachment to service 122 for analysis. In that scenario, the candidate malware is received by service 122 at 1102. As yet another example, candidate malware can be received at 1102 as part of a batch operation (e.g., where cloud security service 122 receives a variety of malware samples over a period of time and a batch of received samples is provided to virtual machine server 124 for processing—with virtual machine server 124 receiving the batch at 1102). Further, the batch operation can be repeated (e.g., on the same set of samples or on a set that includes at least some of the same samples as previous batches).

At 1104, dynamic analysis of a malware sample for detecting malware via scanning for dynamically generated function pointers in memory is performed in a computing environment. For example, the computing environment can be implemented by initializing a virtual machine instance (e.g., an instrumented virtual environment, such as similarly described above with respect to 112 and 124 of FIG. 1). The virtual environment is instrumented, as applicable, such that behaviors observed while the application is executing are logged and/or monitored (e.g., generating initial, interim, and/or final snapshots of memory, intercepting/hooking system call/API events, etc.) as similarly described above.

At 1106, an interface is generated that includes a graphical visualization of a plurality of pages in memory associated with a process launched during execution of the malware sample in the computing environment, in which the graphical visualization of the plurality of pages in memory indicates detection of a dynamically generated function pointer(s) associated with one or more of the plurality of pages in memory that were modified during execution of the malware sample as further described below at 1108. For example, a tool for detecting malware via scanning for dynamically generated function pointers in memory can be provided that generates a graphical visualization of a plurality of pages in memory associated with a process launched to identify a subset of the plurality of pages in memory that were modified during execution of the malware sample in the computing environment as similarly described above.

Finally, at 1108, a dynamically generated function pointer(s) detected in memory during execution of the malware sample is identified in the interface. For example, the interface can indicate a dynamically generated function pointer(s) in memory (e.g., including a type of memory associated with the modified pages in memory, such as stack, heap, other/unknown, etc.) as shown in FIGS. 8A-B as similarly described above.

Although the foregoing embodiments have been described in some detail for purposes of clarity of understanding, the invention is not limited to the details provided. There are many alternative ways of implementing the invention. The disclosed embodiments are illustrative and not restrictive.

APPENDIX-A

ACTIVEXOBJECTFNCOBJ_CONSTRUCT
ADJUSTTOKENPRIVILEGES
ASSIGNPROCESSTOJOBOBJECT
ATTACHTHREADINPUT
BITBLT
CDOCUMENT_WRITE
CELEMENT_PUT_INNERHTML
CHYPERLINK_SETURLCOMPONENT
CIFRAMEELEMENT_CREATEELEMENT
CIMGELEMENT_PUT_SRC
COLESCRIPT_COMPILE
CSCRIPTELEMENT_PUT_SRC
CWINDOW_ADDTIMEOUTCODE
CALLNEXTHOOKEX
CERTCONTROLSTORE
CERTCREATECERTIFICATECONTEXT
CERTOPENSTORE
CERTOPENSYSTEMSTORE
CERTOPENSYSTEMSTOREA
CERTOPENSYSTEMSTOREW
CHECKREMOTEDEBUGGERPRESENT
COCREATEINSTANCE
COCREATEINSTANCEEX
COGETCLASSOBJECT
COINITIALIZEEX
COINITIALIZESECURITY
COUNINITIALIZE
CONNECTEX
CONNECTNAMEDPIPE
CONTROLSERVICE
COPYFILEA
COPYFILEEXW
COPYFILEW
CREATEACTCTW
CREATEDIRECTORYEXW
CREATEDIRECTORYW
CREATEFILE
CREATEFILEMAPPING
CREATEFILEW
CREATEJOBOBJECTW
CREATEMUTEX
CREATEMUTEXW
CREATEPROCES S
CREATEPROCESSINTERNALW
CREATEREMOTETHREAD
CREATEREMOTETHREADEX
CREATESERVICE
CREATESERVICEA
CREATESERVICEW
CREATETHREAD
CREATETOOLHELP32SNAPSHOT
CRYPTACQUIRECONTEXT
CRYPTACQUIRECONTEXTA
CRYPTACQUIRECONTEXTW
CRYPTCREATEHASH
CRYPTDECODEMESSAGE
CRYPTDECODEOBJECTEX
CRYPTDECRYPT
CRYPTDECRYPTMESSAGE
CRYPTENCRYPT
CRYPTENCRYPTMESSAGE
CRYPTEXPORTKEY
CRYPTGENKEY
CRYPTHASHDATA
CRYPTHASHMESSAGE
CRYPTPROTECTDATA
CRYPTPROTECTMEMORY
CRYPTUNPROTECTDATA
CRYPTUNPROTECTMEMORY
DECRYPTMESSAGE
DELETEFILE
DELETEFILEW
DELETESERVICE
DELETEURLCACHEENTRYA
DELETEURLCACHEENTRYW
DEVICEIOCONTROL
DLLCANUNLOADNOW
DLLGETCLASSOBJECT
DLLINSTALL
DLLREGISTERSERVER
DLLUNREGISTERSERVER
DNSQUERY_A
DNSQUERY_UTF8
DNSQUERY_W
DRAWTEXTEXA
DRAWTEXTEXW
ENABLEEXECUTEPROTECTIONSUPPORT
ENCRYPTMESSAGE
ENUMPROCESSMODULES
ENUMPROCESSES
ENUMSERVICESSTATUSA
ENUMSERVICESSTATUSW
ENUMWINDOWS
EXITWINDOWSEX
FINDFIRSTFILE/FINDNEXTFILE
FINDFIRSTFILEEXA
FINDFIRSTFILEEXW
FINDRESOURCE
FINDRESOURCEA
FINDRESOURCEEXA
FINDRESOURCEEXW
FINDRESOURCEW
FINDWINDOW
FINDWINDOWA
FINDWINDOWEXA
FINDWINDOWEXW
FINDWINDOWW
FTPPUTFILE
GETADAPTERSADDRESSES
GETADAPTERSINFO
GETADDRINFOW
GETASYNCKEYSTATE
GETBESTINTERFACEEX
GETCOMPUTERNAMEA
GETCOMPUTERNAMEW
GETCURSORPOS
GETDC
GETDISKFREESPACEEXW
GETDISKFREESPACEW
GETFILEATTRIBUTESEW
GETFILEATTRIBUTESW
GETFILEINFORMATIONBYHANDLE
GETFILEINFORMATIONBYHANDLEEX
GETFILESIZE
GETFILESIZEEX
GETFILETYPE
GETFILEVERSIONINFOEXW
GETFILEVERSIONINFOSIZEEW
GETFILEVERSIONINFOSIZEW
GETFILEVERSIONINFOW
GETFOREGROUNDWINDOW
GETINTERFACEINFO

GETIPSTATISTICSEX
GETKEYSTATE
GETKEYBOARDSTATE
GETLASTINPUTINFO
GETLOCALTIME
GETMODULEFILENAME
GETMODULEHANDLE
GETMODULEHANDLEA
GETMODULEHANDLEW
GETNATIVESYSTEMINFO
GETPROCADDRESS
GETSHORTPATHNAMEW
GETSTARTUPINFO
GETSYSTEMDEFAULTLANGID
GETSYSTEMDIRECTORYA
GETSYSTEMDIRECTORYW
GETSYSTEMINFO
GETSYSTEMMETRICS
GETSYSTEMTIME
GETSYSTEMTIMEASFILETIME
GETSYSTEMWINDOWSDIRECTORYA
GETSYSTEMWINDOWSDIRECTORYW
GETTEMPPATH
GETTEMPPATHW
GETTHREADCONTEXT
GETTICKCOUNT
GETTIMEZONEINFORMATION
GETUSERNAMEA
GETUSERNAMEEXA
GETUSERNAMEEXW
GETUSERNAMEW
GETVERSIONEX
GETVOLUMENAMEFORVOLUMEMOUNTPOINTW
GETVOLUMEPATHNAMEW
GETVOLUMEPATHNAMESFORVOLUMENAMEW
GETWINDOWSDIRECTORY
GLOBALMEMORYSTATUS
GLOBALMEMORYSTATUSEX
HTTPOPENREQUESTA
HTTPOPENREQUESTW
HTTPQUERYINFOA
HTTPSENDREQUESTA
HTTPSENDREQUESTW
IWBEMSERVICES_EXECMETHOD
IWBEMSERVICES_EXECMETHODASYNC
IWBEMSERVICES_EXECQUERY
IWBEMSERVICES_EXECQUERYASYNC
INTERNETCLOSEHANDLE
INTERNETCONNECTA
INTERNETCONNECTW
INTERNETCRACKURLA
INTERNETCRACKURLW
INTERNETGETCONNECTEDSTATE
INTERNETGETCONNECTEDSTATEEXA
INTERNETGETCONNECTEDSTATEEXW
INTERNETOPEN
INTERNETOPENA
INTERNETOPENURL
INTERNETOPENURLA
INTERNETOPENURLW
INTERNETOPENW
INTERNETQUERYOPTIONA
INTERNETREADFILE
INTERNETSETOPTIONA
INTERNETSETSTATUSCALLBACK
INTERNETWRITEFILE
ISDEBUGGERPRESENT
ISNTADMIN
ISWOW64PROCESS
LDRGETDLLHANDLE
LDRGETPROCEDUREADDRESS
LDRLOADDLL
LDRUNLOADDLL
LOADLIBRARY
LOADLIBRARYEXW
LOADRESOURCE
LOADSTRINGA
LOADSTRINGW
LOOKUPACCOUNTSIDW
LOOKUPPRIVILEGEVALUEW
LSAENUMERATELOGONSESSIONS
MAPVIEWOFFILE
MAPVIRTUALKEY
MESSAGEBOXTIMEOUT
MESSAGEBOXTIMEOUTA
MESSAGEBOXTIMEOUTW
MMGETSYSTEMROUTINEADDRESS
MODULE32FIRST/MODULE32NEXT
MODULE32FIRSTW
MODULE32NEXTW
MOVEFILEWITHPROGRESS
MOVEFILEWITHPROGRESSW
NETGETJOININFORMATION
NETSCHEDULEJOBADD
NETSHAREENUM
NETUSERGETINFO
NETUSERGETLOCALGROUPS
NOTIFYBOOTCONFIGSTATUS
NTALLOCATEVIRTUALMEMORY
NTCLOSE
NTCREATEDIRECTORYOBJECT
NTCREATEFILE
NTCREATEKEY
NTCREATEMUTANT
NTCREATEPROCESS
NTCREATEPROCESSEX
NTCREATESECTION
NTCREATETHREAD
NTCREATETHREADEX
NTCREATEUSERPROCESS
NTDELAYEXECUTION
NTDELETEFILE
NTDELETEKEY
NTDELETEVALUEKEY
NTDEVICEIOCONTROLFILE
NTDUPLICATEOBJECT
NTENUMERATEKEY
NTENUMERATEVALUEKEY
NTFREEVIRTUALMEMORY
NTGETCONTEXTTHREAD
NTLOADDRIVER
NTLOADKEY
NTLOADKEY2
NTLOADKEYEX
NTMAKEPERMANENTOBJECT
NTMAKETEMPORARYOBJECT
NTMAPVIEWOFSECTION
NTOPENDIRECTORYOBJECT
NTOPENFILE
NTOPENKEY
NTOPENKEYEX
NTOPENMUTANT
NTOPENPROCESS
NTOPENSECTION

NTOPENTHREAD
NTPROTECTVIRTUALMEMORY
NTQUERYATTRIBUTESFILE
NTQUERYDIRECTORYFILE
NTQUERYFULLATTRIBUTESFILE
NTQUERYINFORMATIONFILE
NTQUERYINFORMATIONPROCESS
NTQUERYKEY
NTQUERYMULTIPLEVALUEKEY
NTQUERYSYSTEMINFORMATION
NTQUERYSYSTEMTIME
NTQUERYVALUEKEY
NTQUEUEAPCTHREAD
NTREADFILE
NTREADVIRTUALMEMORY
NTRENAMEKEY
NTREPLACEKEY
NTRESUMETHREAD
NTSAVEKEY
NTSAVEKEYEX
NTSETCONTEXTTHREAD
NTSETINFORMATIONFILE
NTSETINFORMATIONPROCESS
NTSETVALUEKEY
NTSHUTDOWNSYSTEM
NTSUSPENDTHREAD
NTTERMINATEPROCESS
NTTERMINATETHREAD
NTUNLOADDRIVER
NTUNMAPVIEWOFSECTION
NTWRITEFILE
NTWRITEVIRTUALMEMORY
OBTAINUSERAGENTSTRING
OLECONVERTOLESTREAMTOISTORAGE
OLEINITIALIZE
OPENMUTEX
OPENPROCESS
OPENSCMANAGER
OPENSCMANAGERA
OPENSCMANAGERW
OPENSERVICEA
OPENSERVICEW
OUTPUTDEBUGSTRING
OUTPUTDEBUGSTRINGA
PRF
PARSESCRIPTTEXT
PARSESCRIPTTEXT9
PEEKNAMEDPIPE
PROCESS32FIRST/PROCESS32NEXT
PROCESS32FIRSTW
PROCESS32NEXTW
QUERYPERFORMANCECOUNTER
QUEUEUSERAPC
READCABINETSTATE
READFILE
READPROCESSMEMORY
REGCLOSEKEY
REGCREATEKEYEXA
REGCREATEKEYEXW
REGDELETEKEYA
REGDELETEKEYW
REGDELETEVALUEA
REGDELETEVALUEW
REGENUMKEYEXA
REGENUMKEYEW
REGENUMKEYW
REGENUMVALUEA
REGENUMVALUEW
REGOPENKEY
REGOPENKEYEXA
REGOPENKEYEXW
REGQUERYINFOKEYA
REGQUERYINFOKEYW
REGQUERYVALUEEXA
REGQUERYVALUEEXW
REGSETVALUEEXA
REGSETVALUEEXW
REGISTERHOTKEY
REMOVEDIRECTORYA
REMOVEDIRECTORYW
RESUMETHREAD
RTLADDVECTOREDCONTINUEHANDLER
RTLADDVECTOREDEXCEPTIONHANDLER
RTLALLOCATEHEAP
RTLCOMPRESSBUFFER
RTLCREATEREGISTRYKEY
RTLCREATEUSERPROCESS
RTLCREATEUSERTHREAD
RTLDECOMPRESSBUFFER
RTLDECOMPRESSFRAGMENT
RTLDISPATCHEXCEPTION
RTLFREEHEAP
RTLREMOVEVECTOREDCONTINUEHANDLER
RTLREMOVEVECTOREDEXCEPTIONHANDLER
RTLWRITEREGISTRYVALUE
SHGETFOLDERPATHW
SHGETSPECIALFOLDERLOCATION
SAMICONNECT
SAMIGETPRIVATEDATA
SAMQUERYINFORMATIONUSE
SEARCHPATHW
SENDNOTIFYMESSAGEA
SENDNOTIFYMESSAGEW
SETENDOFFILE
SETERRORMODE
SETFILEATTRIBUTES
SETFILEATTRIBUTESW
SETFILEINFORMATIONBYHANDLE
SETFILEPOINTER
SETFILEPOINTEREX
SETFILETIME
SETINFORMATIONJOBOBJECT
SETSYSTEMPOWERSTATE
SETTHREADCONTEXT
SETTIMER
SETUNHANDLEDEXCEPTIONFILTER
SETWINDOWLONG
SETWINDOWSHOOKEX
SETWINDOWSHOOKEXA
SETWINDOWSHOOKEW
SFCFILEEXCEPTION
SFCTERMINATEWATCHERTHREAD
SHELLEXECUTE
SHELLEXECUTEEXW
SIZEOFRESOURCE
SLEEPEX
SSL3GENERATEKEYMATERIAL
STARTSERVICE
STARTSERVICEA
STARTSERVICECTRLDISPATCHER
STARTSERVICECTRLDISPATCHERW
STARTSERVICEW
SUSPENDTHREAD
TASKDIALOG

THREAD32FIRST
THREAD32FIRST/THREAD32NEXT
THREAD32NEXT
TOOLHELP32READPROCESSMEMORY
TRANSMITEILE
URLDOWNLOADTOCACHEFILEW
URLDOWNLOADTOFILE
URLDOWNLOADTOFILEW
UNHOOKWINDOWSHOOKEX
UUIDCREATE
VIRTUALALLOC
VIRTUALALLOCEX
VIRTUALPROTECT
VIRTUALPROTECTEX
WNETGETPROVIDERNAMEW
WSAACCEPT
WSACONNECT
WSARECV
WSARECVFROM
WSASEND
WSASENDTO
WSASOCKETA
WSASOCKETW
WSASTARTUP
WIDECHARTOMULTIBYTE
WINEXEC
WOW64DISABLEWOW64FSREDIRECTION
WRITECONSOLEA
WRITECONSOLEW
WRITEFILE
WRITEPROCESSMEMORY
ZWADDBOOTENTRY
ZWDELETEBOOTENTRY
ZWDELETEFILE
ZWDEVICEIOCONTROLFILE
ZWFSCONTROLFILE
ZWMAPVIEWOFSECTION
ZWMODIFYBOOTENTRY
ZWPROTECTVIRTUALMEMORY
ZWQUERYSYSTEMINFORMATION
ZWQUEUEAPCTHREAD
ZWTERMINATEPROCESS
_CREATEWINDOWEXA
_CREATEWINDOWEW
_DIALOGBOXINDIRECTPARAMA
_DIALOGBOXINDIRECTPARAMW
_NTRAISEEXCEPTION
_RTLRAISEEXCEPTION
ACCEPT
BIND
CLOSESOCKET
CONNECT
GETADDRINFO
GETHOSTBYNAME
GETHOSTNAME
GETSOCKNAME
INET_ADDR
IOCTLSOCKET
KEYBD_EVENT
LISTEN
MOUSE_EVENT
RECV
RECVFROM
SELECT
SEND
SENDTO
SETSOCKOPT
SHUTDOWN
SOCKET
SYSTEM
TIMEGETTIME

APPENDIX-B

1. API Pointers Commonly Found in Heap Memory
ZwClose
GetTickCount
RtlEncodePointer
RtlDecodePointer
2. API Pointers Commonly Found in Stack Memory
GetWindowLongW
RtlNtStatusToDosError
CreateFileA
ZwClose
GetTickCount
CorExitProcess
EnableReportFlag
GetModuleHandleA
GetProcAddress
memmove
RtlQueryEnvironmentVariable_U
ZwQueryValueKey
ZwTerminateProcess
InterlockedCompareExchange
Sleep
RtlDecodePointer
CreateFileW
ZwOpenFile
KiFastSystemCallRet
RtlAllocateHeap
RtlEnterCritical Section
RtlEqualUnicodeString
RtlFreeHeap
3. API Pointers Commonly Found in Other Memory
KiFastSystemCallRet
RtlFreeHeap
ZwResumeThread
EnableReportFlag
RtlAllocateHeap
RegCloseKey
DefDlgProcW
Socket_InitWinsock
CPNatfwtDeregisterProviderInstance
GetMulticastIpAddressEntry
WSCUpdateProvider
send
CreateFileMappingNumaA
EndUpdateResourceA
GetRawInputData
RegisterServicesProcess
ZwGetDevicePowerState
SHCreateStreamOnFileA
NdrNonEncapsulatedUnionMemorySize
PathIsRootA
DrawEscape
EngTextOut
GetGlyphOutlineA
SHSkipJunction
CancelIo
_mkgmtime
memset
GetUserDefaultLangID
ReportEventW
GetOwnerModuleFromTcpEntry RtlLeaveCriticalSection
TlsGetValue
StgIsStorageFile
_aexit_rtn
EditWndProc
ZwCompareTokens
RtlEnterCriticalSection
RtlDecodePointer
RtlEncodePointer

The invention claimed is:

1. A system, comprising:
a processor configured to:
monitor changes in memory during execution of a malware sample in a computing environment, wherein a plurality of pages in memory associated with a process launched by executing the malware sample are identified and monitored for changes during execution of the malware sample in the computing environment, and wherein monitoring changes in memory during execution of a malware sample in a computing environment further comprises:
search the memory for a list of memory locations of accessible system functions;
periodically search the memory after predetermined execution events to detect any memory pointers in the memory;
filter the memory locations where pointers to the system functions were detected in the memory to generate a set of system API function pointers; and
automatically analyze the set of system API function pointers to determine whether the malware sample attempted to obfuscate suspicious or malicious behavior;
detect a dynamically generated function pointer in memory based on an analysis of the monitored changes in memory during execution of the malware sample in the computing environment; and
generate a signature based on detection of the dynamically generated function pointer in memory, wherein the malware sample was determined to be malicious; and
a memory coupled to the processor and configured to provide the processor with instructions.

2. The system recited in claim 1, wherein the computing environment comprises a virtual machine instance.

3. The system recited in claim 1, wherein an output of the monitored changes in memory after a system call event during execution of the malware sample for a predetermined period of time in the computing environment is reassembled and analyzed to identify a potential malware binary, and wherein the potential malware binary is submitted for dynamic analysis and/or static analysis.

4. The system recited in claim 1, wherein a plurality of pages in memory associated with a process launched by executing the malware sample are identified and monitored for changes after one or more system call events during execution of the malware sample for a predetermined period of time in the computing environment.

5. The system recited in claim 1, wherein the processor is further configured to:
receive a plurality of malware samples; and
deduplicate the plurality of malware samples.

6. The system recited in claim 1, wherein the processor is further configured to:
receive a plurality of malware samples;
deduplicate the plurality of malware samples to output a first malware sample; and
execute the first malware sample in the computing environment.

7. The system recited in claim 1, wherein the processor is further configured to:
identify a plurality of pages in memory associated with a process launched by executing the malware sample in the computing environment; and
perform an initial snapshot of all of the plurality of pages in memory associated with the process at initial time $t_0$ and cache the initial snapshot of all of the plurality of pages in memory to provide a baseline for contents in memory while executing the malware sample in the computing environment.

8. The system recited in claim 1, wherein the processor is further configured to:
identify a plurality of pages in memory associated with a process launched by executing the malware sample in the computing environment;
perform an initial snapshot of all of the plurality of pages in memory associated with the process at initial time $t_0$ and cache the initial snapshot of all of the plurality of pages in memory to provide a baseline for contents in memory while executing the malware sample in the computing environment; and
perform a final snapshot of all of the plurality of pages in memory associated with the process at subsequent time $t_n$ after a predetermined period of time or after completion of execution of the malware sample in the computing environment.

9. The system recited in claim 1, wherein the processor is further configured to:
identify a plurality of pages in memory associated with a process launched by executing the malware sample in the computing environment;
perform an initial snapshot of all of the plurality of pages in memory associated with the process at initial time $t_0$ and cache the initial snapshot of all of the plurality of pages in memory to provide a baseline for contents in memory while executing the malware sample in the computing environment; and
perform another snapshot of all of the plurality of pages in memory associated with the process at subsequent time $t_n$ after a predetermined period of time or after a system call event if any return address in a call stack points to a memory address that has changed since the initial snapshot.

10. A method, comprising:
monitoring changes in memory during execution of a malware sample in a computing environment, wherein a plurality of pages in memory associated with a process launched by executing the malware sample are identified and monitored for changes during execution of the malware sample in the computing environment, and wherein monitoring changes in memory during execution of a malware sample in a computing environment further comprises:
searching the memory for a list of memory locations of accessible system functions;
periodically searching the memory after predetermined execution events to detect any memory pointers in the memory;
filtering the memory locations where pointers to the system functions were detected in the memory to generate a set of system API function pointers; and automatically analyzing the set of system API function pointers to determine whether the malware sample attempted to obfuscate suspicious or malicious behavior;

detecting a dynamically generated function pointer in memory based on an analysis of the monitored changes in memory during execution of the malware sample in the computing environment; and generating a signature based on detection of the dynamically generated function pointer in memory, wherein the malware sample was determined to be malicious.

11. The method of claim 10, wherein the computing environment comprises a virtual machine instance.

12. The method of claim 10, wherein an output of the monitored changes in memory after a system call event during execution of the malware sample for a predetermined period of time in the computing environment is reassembled and analyzed to identify a potential malware binary.

13. The method of claim 10, wherein an output of the monitored changes in memory after a system call event during execution of the malware sample for a predetermined period of time in the computing environment is reassembled and analyzed to identify a potential malware binary, and wherein the potential malware binary is submitted for dynamic analysis and/or static analysis.

14. The method of claim 10, wherein a plurality of pages in memory associated with a process launched by executing the malware sample are identified and monitored for changes after one or more system call events during execution of the malware sample for a predetermined period of time in the computing environment.

15. A computer program product, the computer program product being embodied in a non-transitory tangible computer readable storage medium and comprising computer instructions for:

monitoring changes in memory during execution of a malware sample in a computing environment, wherein a plurality of pages in memory associated with a process launched by executing the malware sample are identified and monitored for changes during execution of the malware sample in the computing environment, and wherein monitoring changes in memory during execution of a malware sample in a computing environment further comprises:

searching the memory for a list of memory locations of accessible system functions;

periodically searching the memory after predetermined execution events to detect any memory pointers in the memory;

filtering the memory locations where pointers to the system functions were detected in the memory to generate a set of system API function pointers; and automatically analyzing the set of system API function pointers to determine whether the malware sample attempted to obfuscate suspicious or malicious behavior;

detecting a dynamically generated function pointer in memory based on an analysis of the monitored changes in memory during execution of the malware sample in the computing environment; and generating a signature based on detection of the dynamically generated function pointer in memory, wherein the malware sample was determined to be malicious.

16. The computer program product recited in claim 15, wherein the computing environment comprises a virtual machine instance.

17. The computer program product recited in claim 15, wherein an output of the monitored changes in memory after a system call event during execution of the malware sample for a predetermined period of time in the computing environment is reassembled and analyzed to identify a potential malware binary.

18. The computer program product recited in claim 15, wherein an output of the monitored changes in memory after a system call event during execution of the malware sample for a predetermined period of time in the computing environment is reassembled and analyzed to identify a potential malware binary, and wherein the potential malware binary is submitted for dynamic analysis and/or static analysis.

19. The computer program product recited in claim 15, wherein a plurality of pages in memory associated with a process launched by executing the malware sample are identified and monitored for changes after one or more system call events during execution of the malware sample for a predetermined period of time in the computing environment.

* * * * *

UNITED STATES PATENT AND TRADEMARK OFFICE
CERTIFICATE OF CORRECTION

| | | |
|---|---|---|
| PATENT NO. | : 10,628,586 B1 | Page 1 of 2 |
| APPLICATION NO. | : 15/828172 | |
| DATED | : April 21, 2020 | |
| INVENTOR(S) | : Robert Jung | |

It is certified that error appears in the above-identified patent and that said Letters Patent is hereby corrected as shown below:

In the Specification

In Column 12, Line(s) 17, delete "Kerne132.dll" and insert --Kernel32.dll--, therefor.
In Column 15, Line(s) 18, delete "https://en.wikipedia.org/wiki/RabinKarp algorithm" and insert --https://en.wikipedia.org/wiki/Rabin-Karp algorithm--, therefor.
In Column 15, Line(s) 64, delete "AutoFocus'" and insert --AutoFocusTM--, therefor.
In Column 19, Line(s) 26, delete "tr'" and insert --tn--, therefor.
In Column 21, Line(s) 25, delete "samples-and" and insert --samples and--, therefor.
In Column 24, Line(s) 20, delete "processing-with" and insert --processing with--, therefor.
In Column 25, Line(s) 36, delete "CREATEACTCTW" and insert --CREATEACTXW--, therefor.
In Column 26, Line(s) 55, delete "GETFILEATTRIBUTESEW" and insert --GETFILEATTRIBUTESEXW--, therefor.
In Column 26, Line(s) 63, delete "GETFILEVERSIONINFOSIZEEW" and insert --ETFILEVERSIONINFOSIZEEXW--, therefor.
In Column 29, Line(s) 65, delete "REGENUMKEYEW" and insert --REGENUMKEYEXW--, therefor.
In Column 30, Line(s) 39, delete "SETEILEATTRIBUTES" and insert --SETFILEATTRIBUTES--, therefor.
In Column 30, Line(s) 40, delete "SETEILEATTRIBUTESW" and insert --SETFILEATTRIBUTESW--, therefor.
In Column 30, Line(s) 41, delete "SETEILEINFORMATIONBYHANDLE" and insert --SETFILEINFORMATIONBYHANDLE--, therefor.
In Column 30, Line(s) 42, delete "SETEILEPOINTER" and insert --SETFILEPOINTER--, therefor.
In Column 30, Line(s) 43, delete "SETEILEPOINTEREX" and insert --SETFILEPOINTEREX--, therefor.
In Column 30, Line(s) 44, delete "SETEILETIME" and insert --SETFILETIME--, therefor.
In Column 30, Line(s) 53, delete "SETWINDOWSHOOKEW" and insert --SETWINDOWSHOOKEXW--, therefor.

Signed and Sealed this
Thirteenth Day of April, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 10,628,586 B1

In Column 31, Line(s) 5, delete "TRANSMITEILE" and insert --TRANSMITFILE--, therefor.
In Column 31, Line(s) 44, delete "-CREATEWINDOWEW" and insert
-- -CREATEWINDOWEXW--, therefor.